(12) United States Patent
Lu

(10) Patent No.: US 11,553,580 B2
(45) Date of Patent: Jan. 10, 2023

(54) CONNECTORS AND WIRELESS CONTROLLERS FOR WIRED LIGHTING SYSTEMS

(71) Applicant: FJP Solution LLC, Chino, CA (US)

(72) Inventor: Fang Lu, Chino Hills, CA (US)

(73) Assignee: FJP Solution LLC, Chino, CA (US)

(*) Notice: Subject to any disclaimer, the term of this patent is extended or adjusted under 35 U.S.C. 154(b) by 0 days.

(21) Appl. No.: 17/173,699

(22) Filed: Feb. 11, 2021

(65) Prior Publication Data

US 2021/0352796 A1   Nov. 11, 2021

Related U.S. Application Data

(63) Continuation-in-part of application No. 16/869,301, filed on May 7, 2020, now Pat. No. 11,252,808.

(51) Int. Cl.
*H05B 47/19* (2020.01)
*H05B 47/11* (2020.01)
*G08C 17/02* (2006.01)

(52) U.S. Cl.
CPC .......... *H05B 47/19* (2020.01); *G08C 17/02* (2013.01); *H05B 47/11* (2020.01)

(58) Field of Classification Search
CPC ...... H05B 47/11; H05B 47/175; H05B 47/19; G08C 17/02
See application file for complete search history.

(56) References Cited

U.S. PATENT DOCUMENTS

| | | |
|---|---|---|
| 5,679,023 A | 10/1997 | Anderson, Jr. et al. |
| 5,855,491 A | 1/1999 | Hintner et al. |
| 6,017,241 A | 1/2000 | Komai |
| 6,067,762 A | 5/2000 | Greer et al. |
| 6,172,589 B1 | 1/2001 | Fujita et al. |
| 9,345,155 B1 | 5/2016 | Schmuckle |
| 9,526,152 B1 | 12/2016 | Toomey et al. |
| 9,859,663 B2 | 1/2018 | Sparrowhawk et al. |
| 9,945,538 B2 | 4/2018 | Beausoleil |
| 10,190,761 B1 | 1/2019 | Winters et al. |
| 10,299,342 B1 | 5/2019 | Reddy et al. |
| 10,321,548 B1 * | 6/2019 | Subramaniam ........ H05B 45/20 |
| 10,939,522 B1 * | 3/2021 | Mischel, Jr. ........... H05B 45/20 |
| 2007/0173297 A1 | 7/2007 | Cho et al. |

(Continued)

FOREIGN PATENT DOCUMENTS

| | | |
|---|---|---|
| WO | 2013012826 A1 | 1/2013 |
| WO | 2015002792 A1 | 1/2015 |

*Primary Examiner* — Abdullah A Riyami
*Assistant Examiner* — Syed M Kaiser
(74) *Attorney, Agent, or Firm* — Veros Legal Solutions, LLP

(57) ABSTRACT

A computer-implemented method performed by a device connected to a light and at least a first sensor is disclosed. The method includes: setting a first condition for activating the light; setting a second condition for deactivating the light; transmitting a first signal to the light to activate the light when the first condition is met; transmitting the second signal to the light to deactivate the light when the second condition is met; setting a third condition for activating the first sensor; receiving a signal from the first sensor; if the light is deactivated and the third condition is met, activating the light; and if the light is activated and the third condition is met, keep the light activated.

15 Claims, 22 Drawing Sheets

(56) References Cited

U.S. PATENT DOCUMENTS

| | | |
|---|---|---|
| 2010/0029129 A1 | 2/2010 | Cox et al. |
| 2010/0328852 A1 | 12/2010 | Johnson et al. |
| 2011/0062888 A1 | 3/2011 | Bondy et al. |
| 2012/0001567 A1 | 1/2012 | Knapp et al. |
| 2012/0261487 A1 | 10/2012 | Palmer et al. |
| 2013/0183042 A1 | 7/2013 | Knapp et al. |
| 2013/0200806 A1 | 8/2013 | Chobot |
| 2014/0043807 A1 | 2/2014 | Shibusawa et al. |
| 2014/0111993 A1 | 4/2014 | Bertin |
| 2015/0084515 A1 | 3/2015 | Altamura et al. |
| 2016/0374177 A1* | 12/2016 | Chen .................. G06F 3/04883 |
| 2017/0022712 A1 | 1/2017 | Nelson |
| 2017/0054315 A1 | 2/2017 | Chien |
| 2017/0082271 A1 | 3/2017 | Beausoleil |
| 2017/0105272 A1 | 4/2017 | Johnson |
| 2017/0271918 A1 | 9/2017 | Salerno |
| 2018/0026836 A1* | 1/2018 | Turvy, Jr. ............ H04L 41/0893 709/220 |
| 2018/0191087 A1 | 7/2018 | McGregor et al. |
| 2018/0249054 A1 | 8/2018 | Chien |
| 2018/0294464 A1 | 10/2018 | Mori et al. |
| 2018/0317755 A1 | 11/2018 | Aoki et al. |
| 2018/0325050 A1 | 11/2018 | Bye et al. |
| 2019/0098723 A1* | 3/2019 | Sadwick ................. F21K 9/272 |
| 2019/0116652 A1* | 4/2019 | Oliver ................. H04L 12/2829 |
| 2019/0125905 A1 | 5/2019 | Weeks, Jr. et al. |
| 2019/0150245 A1* | 5/2019 | Chen .................... H05B 39/042 315/149 |
| 2019/0274206 A1 | 9/2019 | Altamura et al. |
| 2019/0320515 A1* | 10/2019 | Sadwick ................ H05B 45/37 |
| 2020/0097747 A1 | 3/2020 | Wang et al. |

* cited by examiner

CONNECTORS AND WIRELESS CONTROLLERS FOR WIRED LIGHTING SYSTEMS

CROSS-REFERENCE TO RELATED APPLICATION

This application is a continuation-in-part of U.S. patent application Ser. No. 16/869,301, filed on May 7, 2020, the disclosure of which is hereby incorporated by reference in its entirety.

FIELD OF THE INVENTION

The field of the invention is lighting systems, more specifically, connectors and wireless controllers for wired lighting systems.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Landscape lighting systems are well known in the art. Such systems typically comprise one or more lighting fixtures wired to a power supply such as a low-voltage transformer and a controller for programming on/off cycles and run times. U.S. Pat. No. 9,345,155 for example, describes a controller for an irrigation and lighting system that is removable from its housing. The controller can be mechanically and electrically disconnected from the housing and has a battery that allows a user to walk around the landscape site "to enable more convenient and intuitive programming of the ON and OFF times for the lighting fixtures." Column 4, lines 58-60. However, it appears the controller does not have the ability to wirelessly communicate with the housing and must be plugged back into the housing to execute the new on/off programming.

U.S. Pat. No. 9,526,152 describes a lighting fixture with an AC-to-DC power conversion unit and a controller built into the housing of the lighting fixture. The controller can wirelessly receive instructions from a remote unit or computing device via an RF signal to execute a pre-programmed on/off cycle. While advantageous in some respects, this approach requires that each lighting fixture have expensive electrical components such as the controller and AC-to-DC power conversion unit, which can increase costs significantly for larger landscape lighting systems that require numerous lighting fixtures.

U.S. Pat. No. 10,299,342 describes systems and methods for retrofitting a mechanical time clock-based lighting control system with a more feature-rich digital control system. Column 2, lines 65-67. This approach provides individually controllable relays coupled to the low voltage side of the power transformer. Column 3, lines 30-31. However, U.S. Pat. No. 10,299,342 fails to describe how the connection leads L1 and L2 are installed into an existing lighting system. It would be advantageous to provide a connector that facilitates installation of a wireless controller into an existing wired lighting system.

Thus, there remains a need for improved systems and methods to retrofit a wired lighting systems with wireless controllers.

SUMMARY OF THE INVENTION

In one aspect of the disclosure, the inventive subject matter provides apparatus, systems, and methods in which a connector is used to connect a wireless controller to a wired lighting system or to adapt or modify a wired lighting system to be controlled by a wireless controller, or by wireless means/methods. The connector comprises a base portion and at least one cap that removably couples with the base portion. The cap is removed from the base portion to reveal a top surface of the base portion. The top surface of the base portion has two channels or slots for receiving two wires. Each channel has one or more electrically conductive teeth that pierce a shielding on the wire when the wire is pressed into the channel. A first wire is used for electrically coupling the connector to a transformer (e.g., power supply) and a second wire is used for electrically coupling the connector to one or more lighting devices (e.g., landscape lighting). In some embodiments, the connector has a first cap that covers the first channel and a second cap that covers the second channel. The underside of each cap can include one or more teeth to assist with aligning the wires in the channels.

The base portion also comprises an output port and an input port for establishing a circuit with a wireless controller. The first channel, which receives a current from the transformer, is electrically coupled with the input port. The second channel, which sends a current to the lighting devices, is electrically coupled with the output port. In this manner, when the input and output ports are connected with the wireless controller via a wired connection, the controller can control a current (e.g., on/off signal) that is sent to the lighting devices.

The first and second channels are electrically coupled with the input and output ports, respectively, via the electrically conductive teeth in each of the channels. A bottom cover on the underside of the base portion can be removed to reveal a third channel and a fourth channel with one or more electrically conductive teeth. When the bottom cover is attached to the base portion, the assembly provides a housing wherein the input port provides access to the third channel and the output port provides access to the fourth channel. A third and fourth wire can be pressed into the third and fourth channels so that the electrically conductive teeth pierce a shielding on the wires to establishing an electrical coupling between the first and third channels, and second and fourth channels. When a wireless controller is connected to the third wire via the input port and the fourth wire via the output port, a circuit between the transformer, connector, wireless controller, and lighting devices is established.

The controller is capable of wirelessly communicating with one or more electronic devices via a wireless communication protocol (e.g., WiFi®, Bluetooth®). The electronic device can comprise a computer (e.g., desktop computer, laptop, mobile phone, tablet, etc.) for controlling the signal to the lighting devices. The computer can include executable software instructions (e.g., apps, programs) that are programmed to configure settings and policies for managing the wired lighting system. The one or more electronic devices can also include a sensor, such as a motion sensor and/or a light sensor, or a wireless lighting device such as a battery powered or solar powered lighting device.

In another aspect of the disclosure, a system and method of controlling the settings of one or more devices (e.g., lights) is disclosed. The network of devices can include one or more sensors, lighting devices (or "lights"), and/or controllers. Each of the sensors, lighting devices, and/or controllers may be a wired or wireless device connected to at least one other device on the network. The network of devices can be programmed to provide intelligent customizable lighting solutions indoor and/or outdoor. Specifically, for example, individual lighting devices (e.g., landscape lights) can be turned on, off, dimmed, and/or brightened based on the combination of signals received from the one or more timing sensors and/or controllers. A remote device (e.g., a smartphone) can be programmed to receive user input to configure the settings of the one or more devices of the network to achieve the desired effects from the devices.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
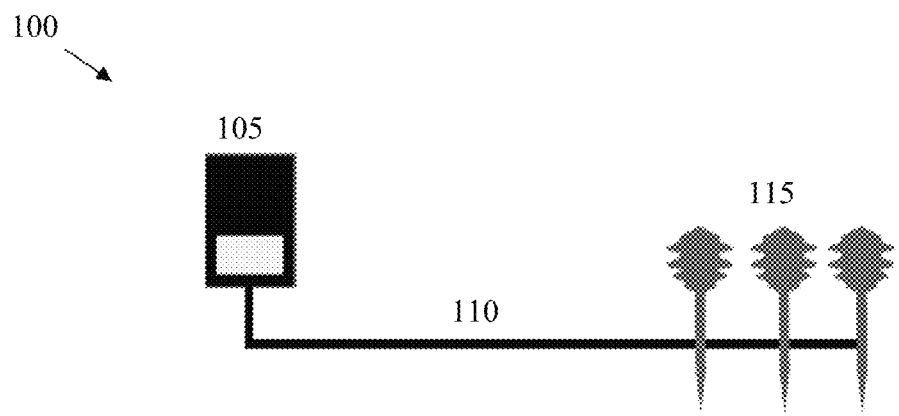
FIG. 1 is a schematic of a wired lighting system.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Two electronic devices that are "functionally coupled to" one another are coupled in a manner to allow data to pass from one electronic device to another electronic device via any wired or wireless means via any number of intermediary devices.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. Computer software that is "programmed" with instructions is developed, compiled, and saved to a computer-readable non-transitory medium specifically to accomplish the tasks and functions set forth by the disclosure when executed by a computer processor.

FIG. 1 is a schematic of a wired lighting system 100 that has a transformer 105 (e.g., power supply) electrically connected with a plurality of lighting devices 115 via a wire 110.

Transformer 105 provides a low-voltage signal to the lighting devices 115 via wire 110 to control an on/off state of the lighting devices 115. The on/off state of the lighting devices 115 must be controlled locally at the transformer 105 or at a wired controller connected with wire 110 (not shown).

Figure 2:
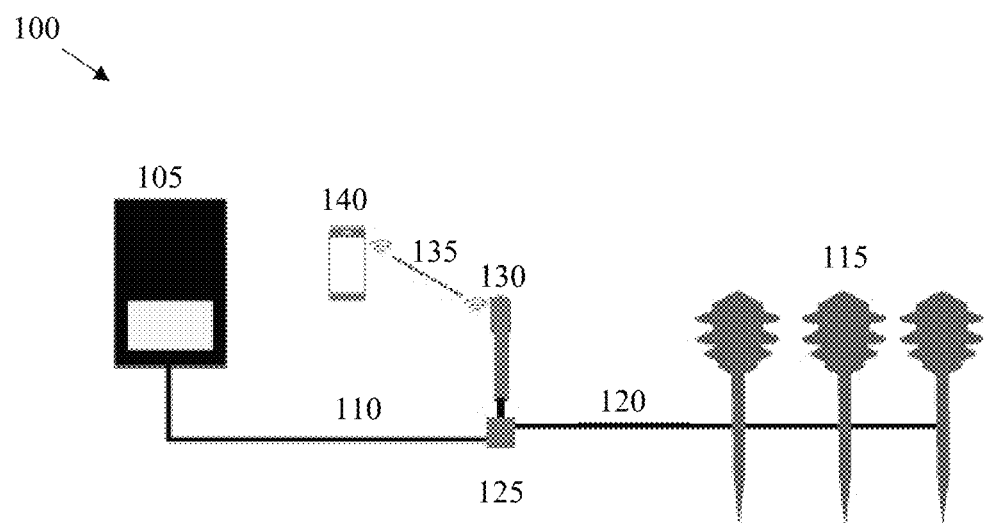
FIG. 2 is a schematic of a wired lighting system with a wireless controller.

FIG. 2 is a schematic of the wired lighting system 100 with a connector 125 electrically connected with wire 110 between transformer 105 and lighting devices 115. Connector 125 is electrically coupled with lighting devices 115 via wire 120. Connector 125 is also electrically connected with a wireless controller 130, which has a transceiver for sending and receiving signals via a wireless connection 135 to a computing device 140. Computing device 140 has a processor, non-transitory storage medium, and executable software instructions programmed to control an off/off state of the wireless controller. In this manner, a user can control an on/off state of the lighting devices 115 either locally via a wired controller or remotely via the wireless connection 135. Wireless connection 135 can be a local area network or a wide area network, including Bluetooth® and/or WiFi® protocols.

Figure 3:
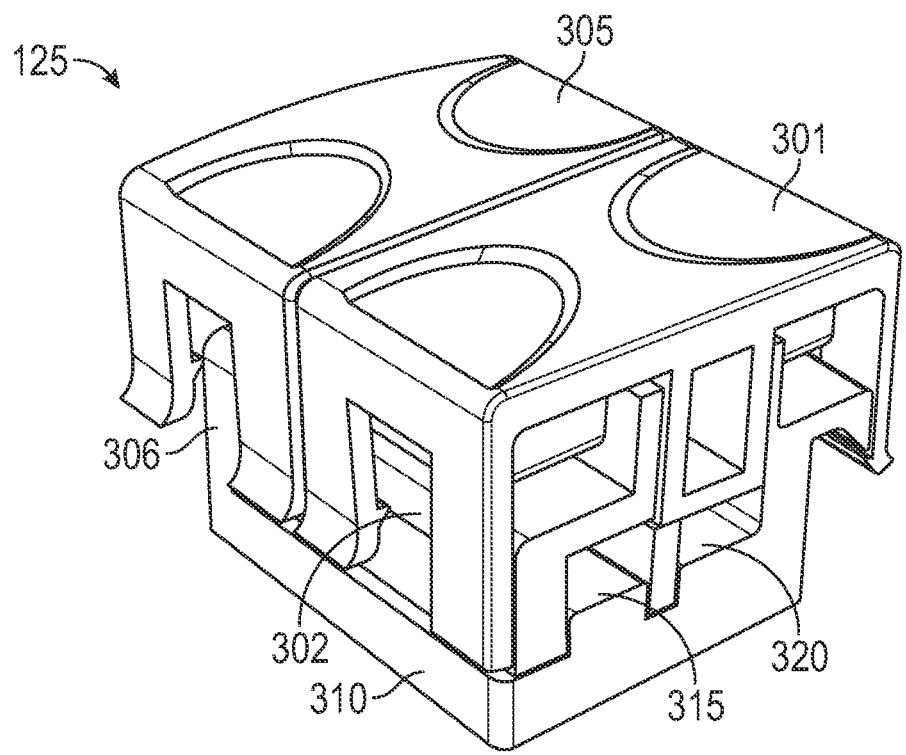
FIG. 3 is a perspective view of a connector for electrically coupling a wireless controller to a wired lighting system.

FIG. 3 is a perspective view of connector 125. Connector 125 is configured to be easily installed into the wired lighting system 100 so that a wired lighting system can be easily converted into a wirelessly controlled system. Connector 125 has a first cap 301 that can be removed from a base portion 310 to reveal a first channel 302. Wire 110 can be placed in the first channel 302 to electrically couple connector 125 to transformer 105. Connector 125 also has a second cap 305 that can be removed from the base portion 310 to reveal a second channel 306. Wire 120 can be placed in the second channel 306 to electrically couple connector 125 to the lighting devices 115. It is contemplated that in alternative embodiments the first cap 301 and the second cap 305 could be combined into one cap.

Base portion 310 has a port 315 and a port 320 for electrically connecting two additional wires for establishing a circuit between connector 125 and wireless controller 130, as described in more detail below.

Figure 4:
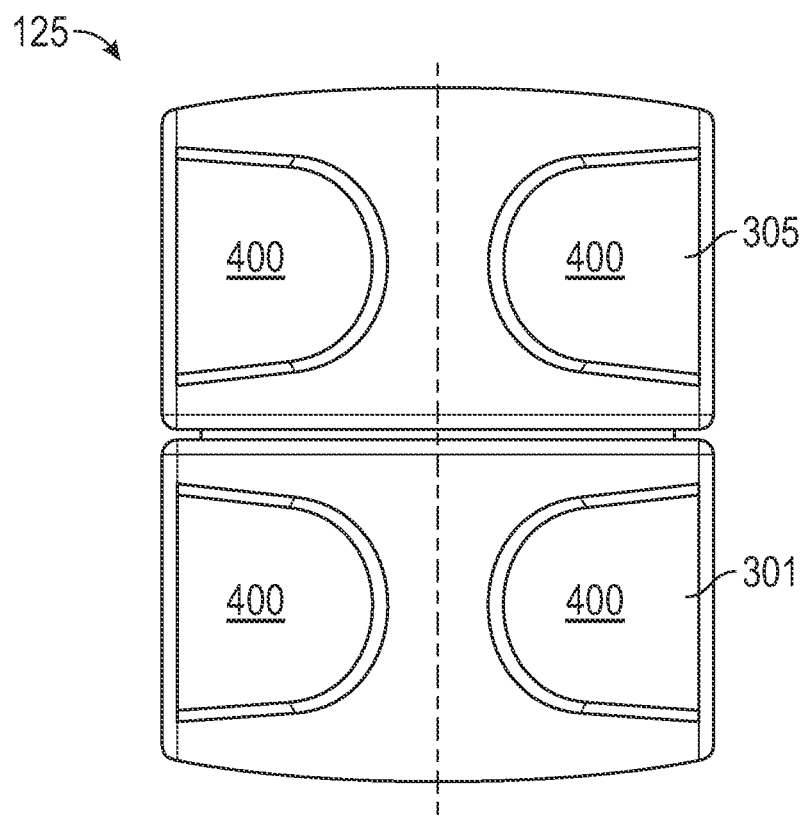
FIG. 4 is a top view of the connector of FIG. 3.

FIG. 4 is a top view of the first cap 301 and the second cap 305 of connector 125. First cap 301 and second cap 305 each have a pair of depressions 400 to facilitate their attachment and removal from base portion 310.

Figure 5:
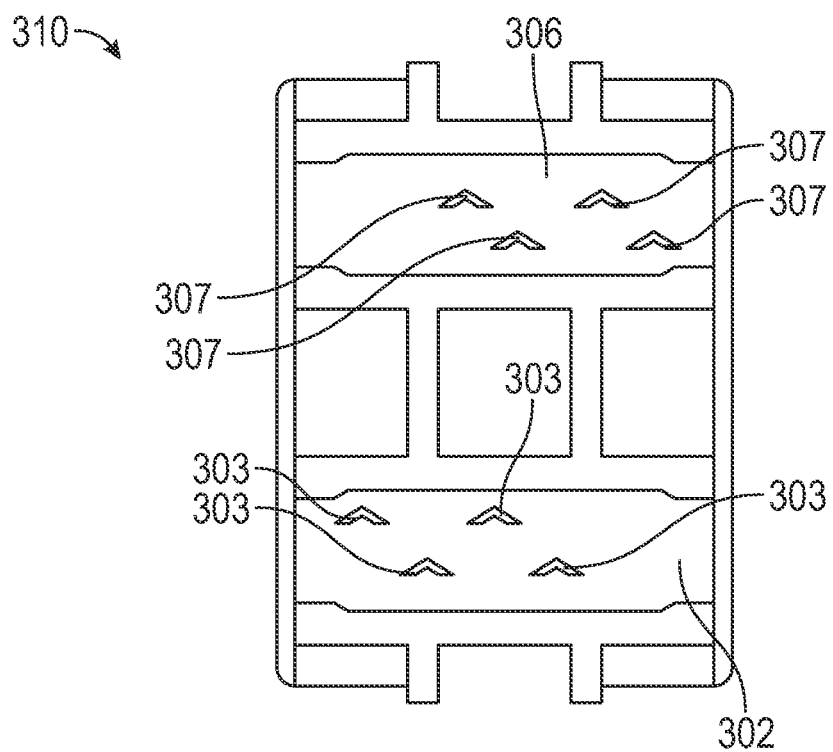
FIG. 5 is a top view of the base portion of the connector of FIG. 3 with the two caps removed.

FIG. 5 is a top view of the base portion 310 of connector 125 with the first cap 301 and the second cap 305 removed to reveal the first channel 302 and the second channel 306, respectively. The first channel 302 has one or more sharp teeth 303 and the second channel 306 has one or more sharp teeth 307. Teeth 303 and teeth 307 are made of an electrically conductive material and are sharp enough to pierce the shielding of wire 110 and wire 120 when they are pressed into first channel 302 and second channel 306, respectively.

Figure 6:
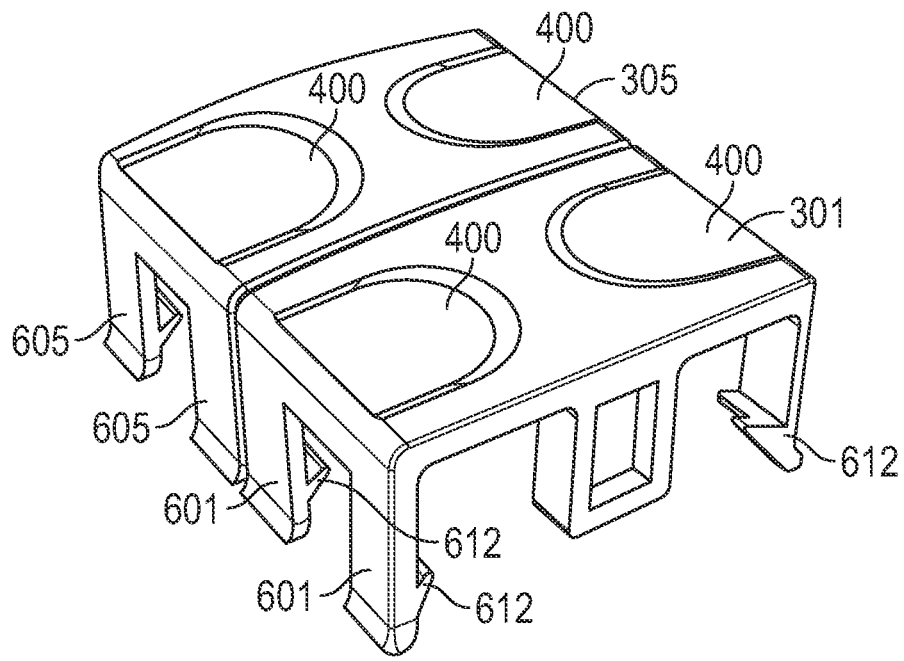
FIG. 6 is a perspective view of the two caps removed from the base portion of the connector of FIG. 3.

FIG. 6 is a perspective view of the first cap 301 and the second cap 305 showing their depressions 400. First cap 301 also has a plurality of legs 601 and second cap 305 has a plurality of legs 605. Legs 601 and legs 605 have tabs 612 for latching onto base portion 310.

Figure 7:
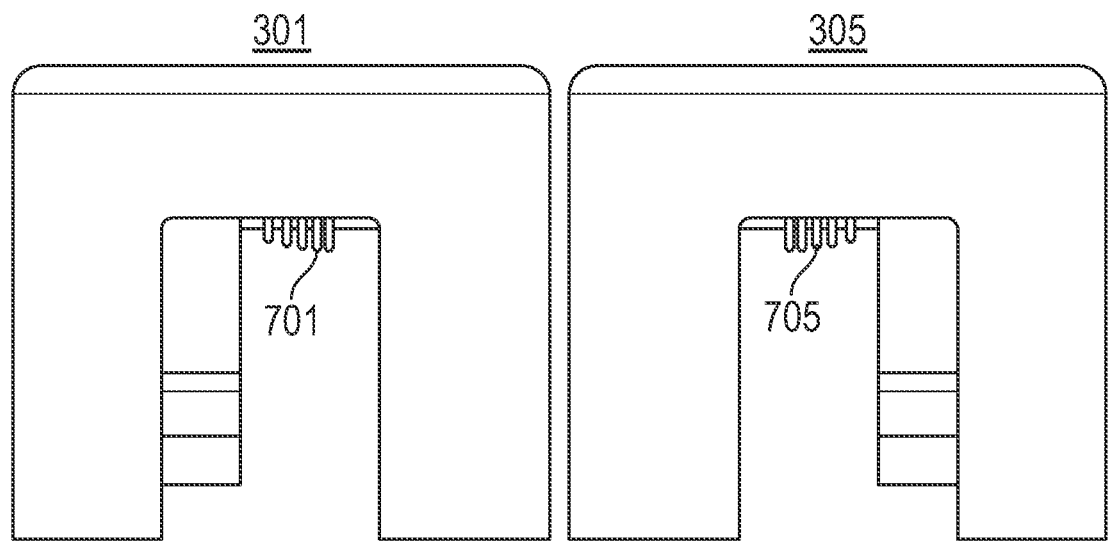
FIG. 7 is a front view of the two caps of FIG. 6.

FIG. 7 is a front view of first cap 301 and second cap 305. First cap 301 has one or more protrusions 701 and second cap 305 has one or more protrusions 705. Protrusions 701 and protrusions 705 help align wire 110 and wire 120, respectively, when wire 110 is placed in the first channel 302 and wire 120 is placed in the second channel 306. For example, protrusions 701 and protrusions 705 can be sized and dimensioned to fit within a longitudinal groove in wire 110 and wire 120.

Figure 8:
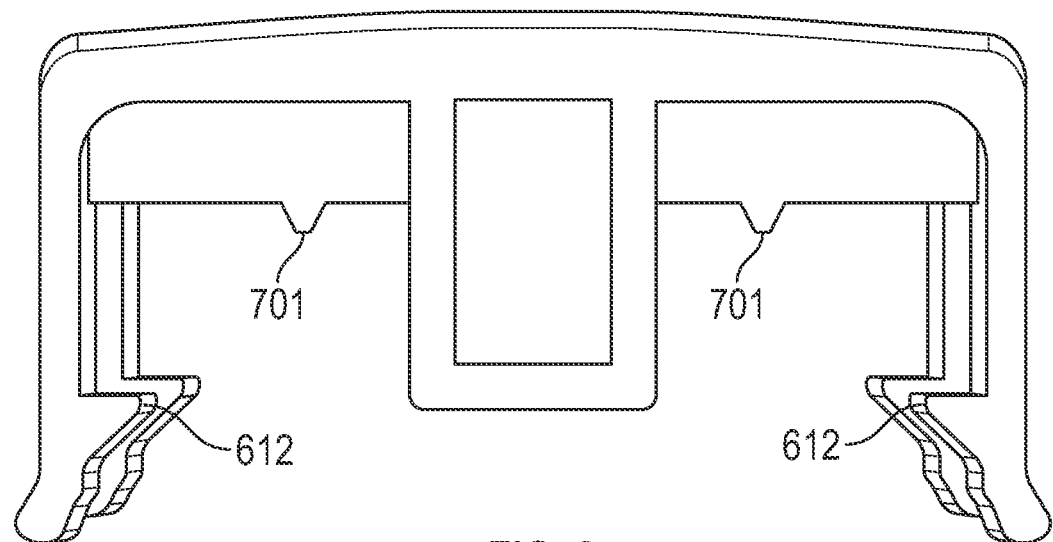
FIG. 8 is a side view of the first cap of FIG. 6.

FIG. 8 is a side view of the first cap 301, showing protrusions 701 and tabs 612 for latching onto base portion 310.

Figure 9:
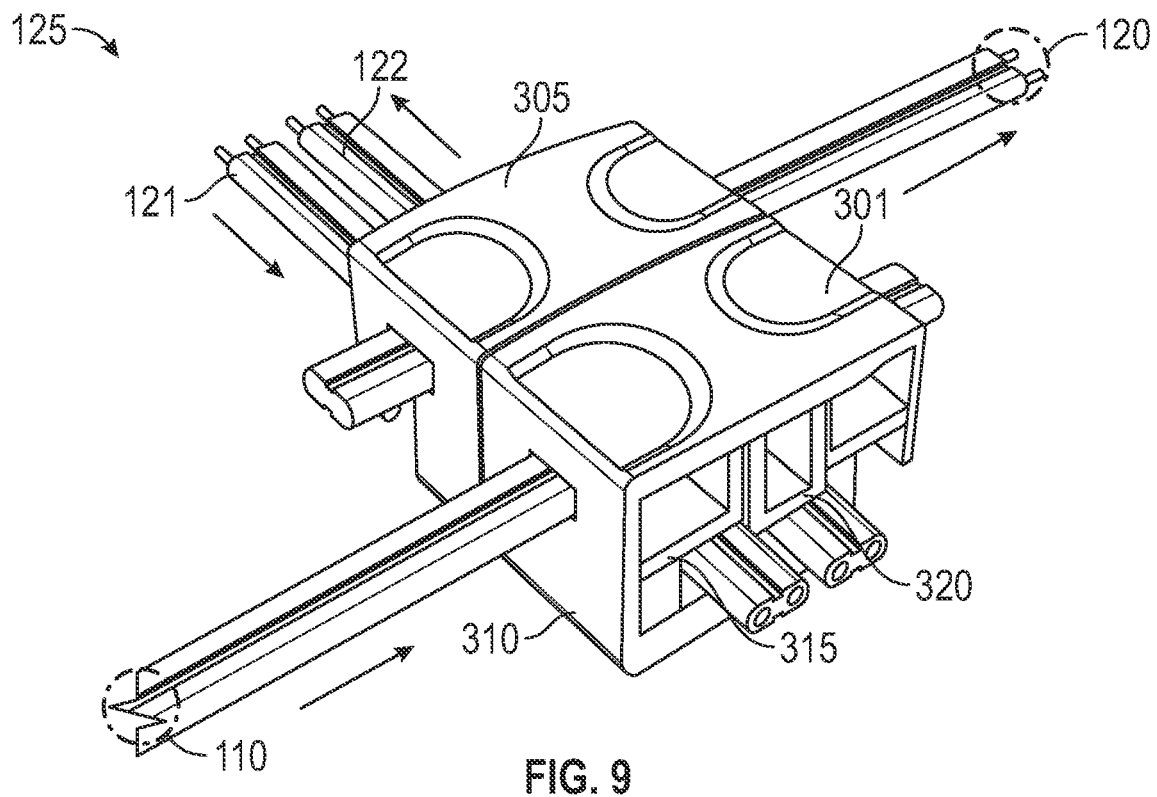
FIG. 9 is a perspective view of the connector of FIG. 3 connected with four wires.

FIG. 9 is a perspective view of connector 125 connected with wire 110, wire 120, wire 121, and wire 122. Wire 110 electrically connects connector 125 to transformer 105. Wire 120 electrically connects connector 125 to lighting devices 115. Wire 121 is placed in port 315 of connector 125 and electrically connects connector 125 to wireless controller 130 as a receive signal. Wire 122 is placed in port 320 of connector 125 and electrically connects connector 125 to wireless controller 130 as a send signal.

Figure 10:
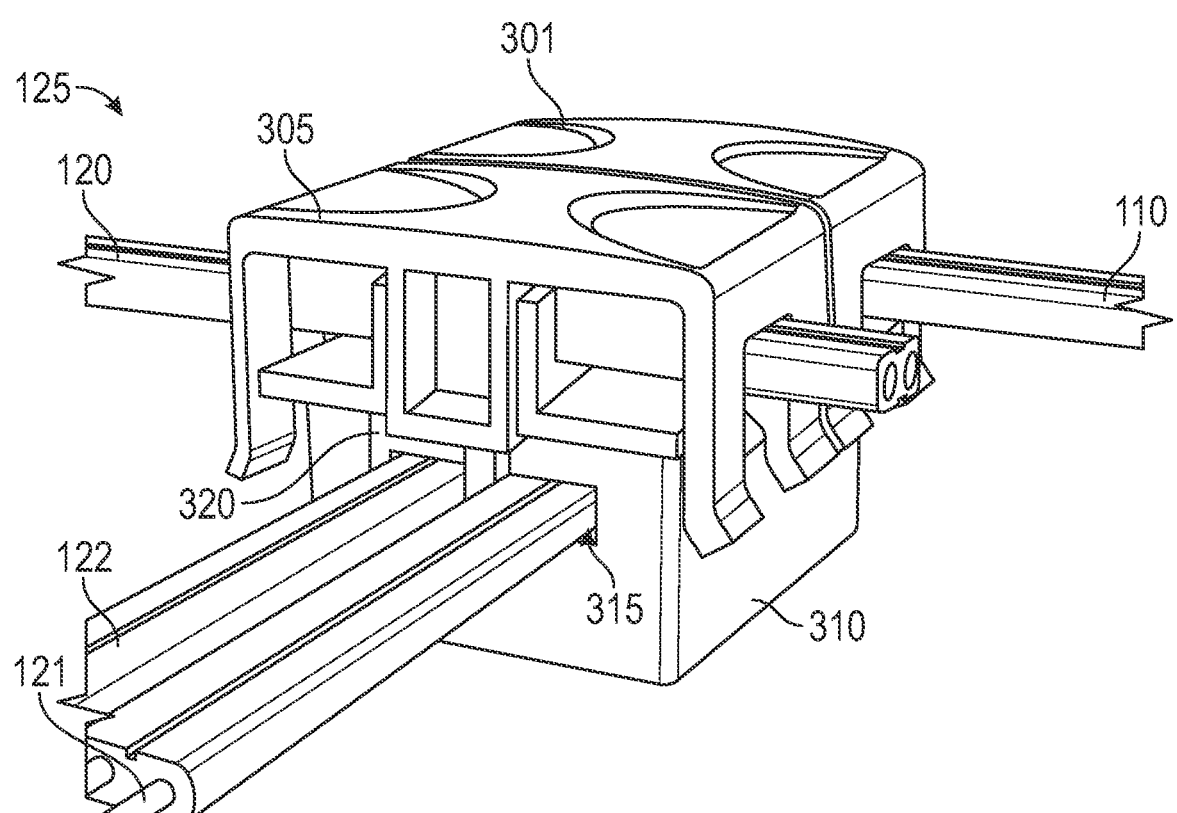
FIG. 10 is another perspective view of the connector of FIG. 9.

FIG. 10 is a different perspective view of connector 125 connected with wire 110, wire 120, wire 121, and wire 122.

Figure 11:
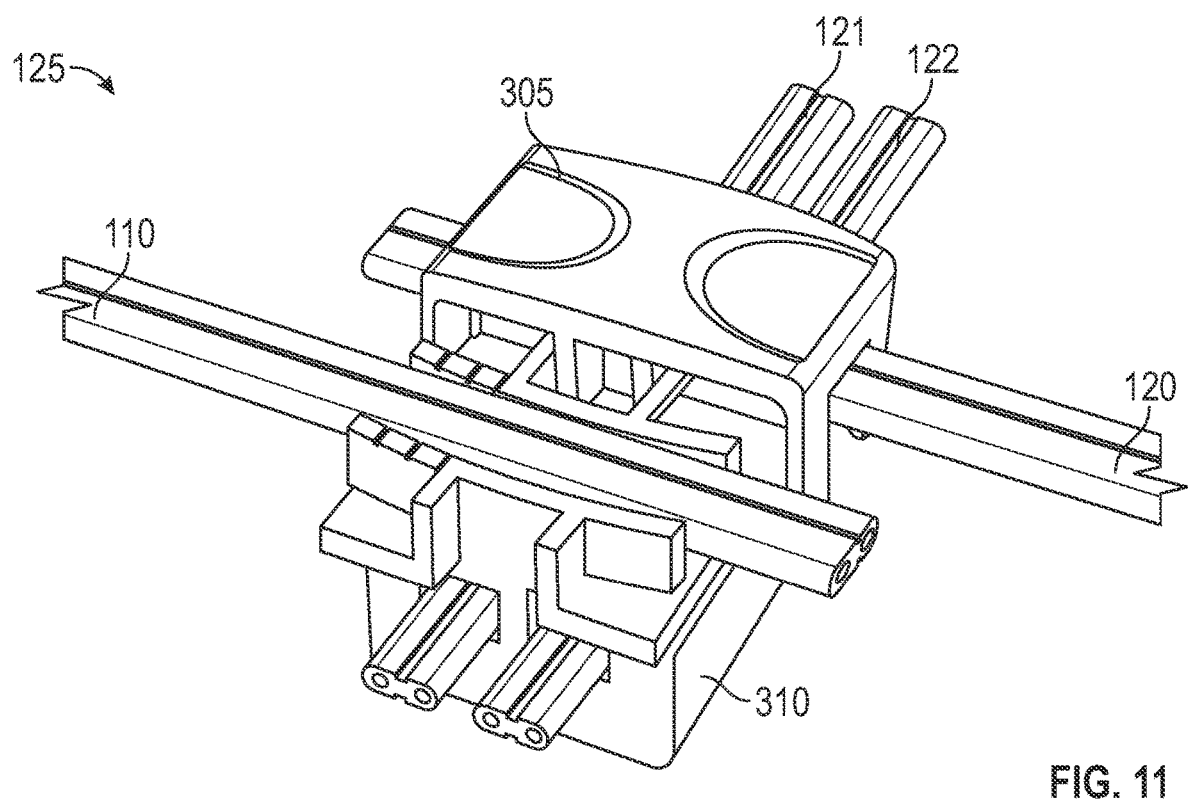
FIG. 11 is a perspective view of the connector of FIG. 9 with a cap removed.

FIG. 11 is a perspective view of connector 125 connected with wire 110, wire 120, wire 121, and wire 122 and with the first cap 301 removed.

Figure 12:
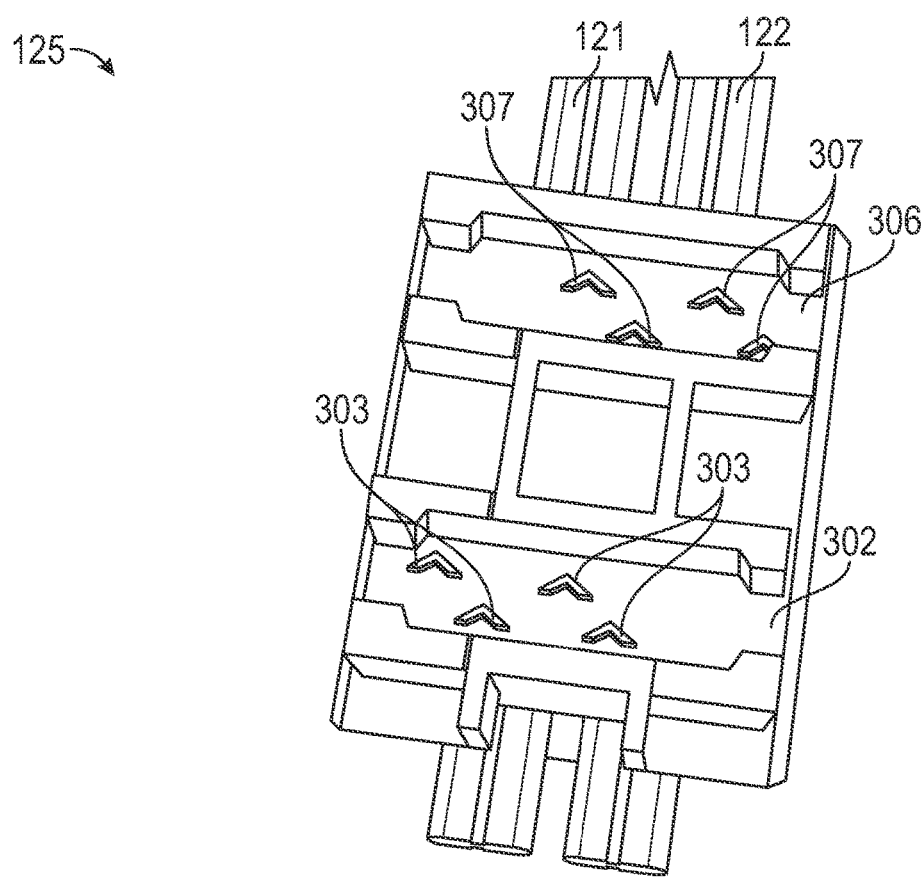
FIG. 12 is a top perspective view of the connector of FIG. 9 with both caps removed and two wires removed.

FIG. 12 is a top perspective view of connector 125 with the first cap 301, the second cap 305, wire 110 and wire 120 removed. First channel 302 has one or more teeth 303 for establishing an electrical connection with port 320 and wire 122. Second channel 306 has one or more teeth 307 for establishing an electrical connection with port 315 and wire 121.

Figure 13:
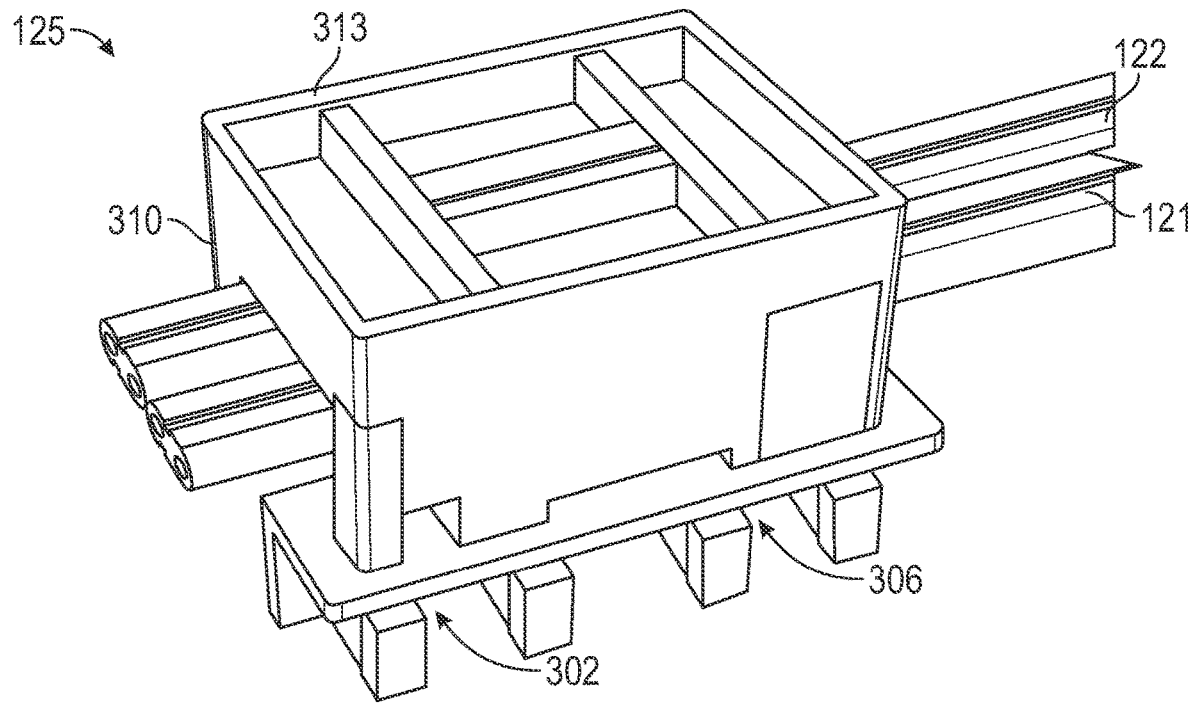
FIG. 13 is a bottom perspective view of the connector of FIG. 12.
Figure 14:
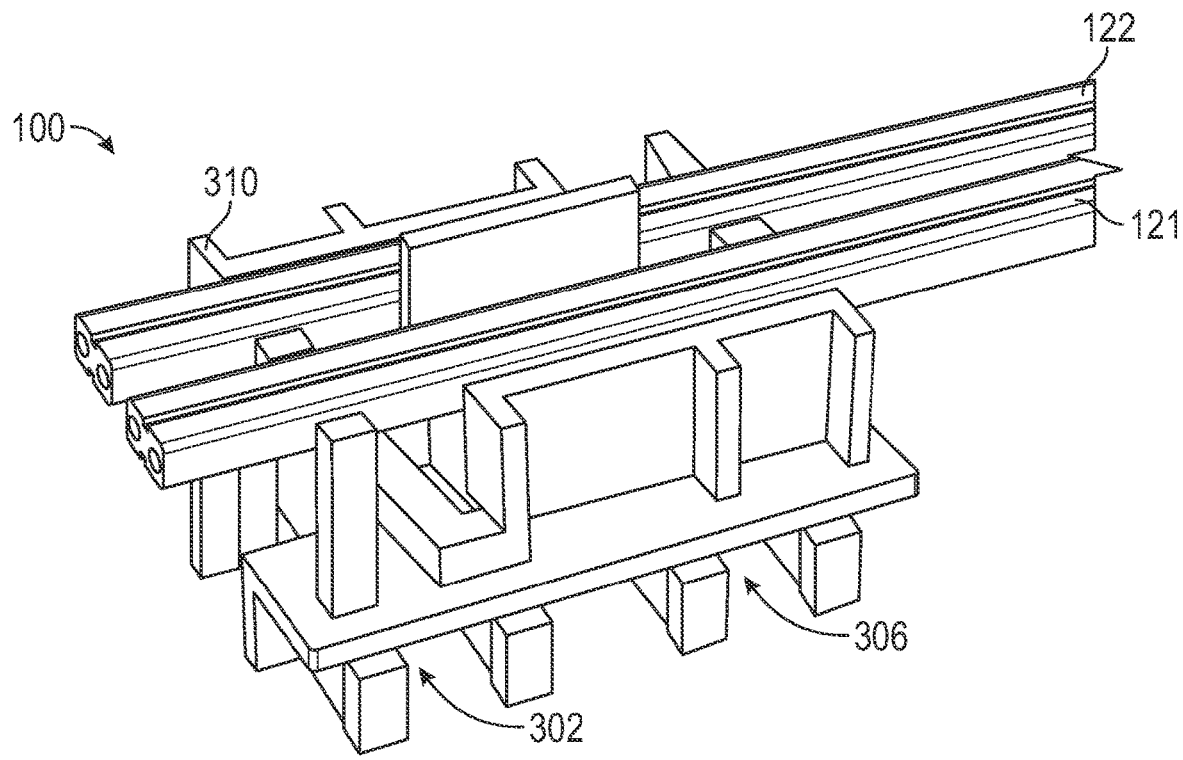
FIG. 14 is a bottom perspective view of the connector of FIG. 12 with the bottom cover of the base portion removed.
Figure 15:
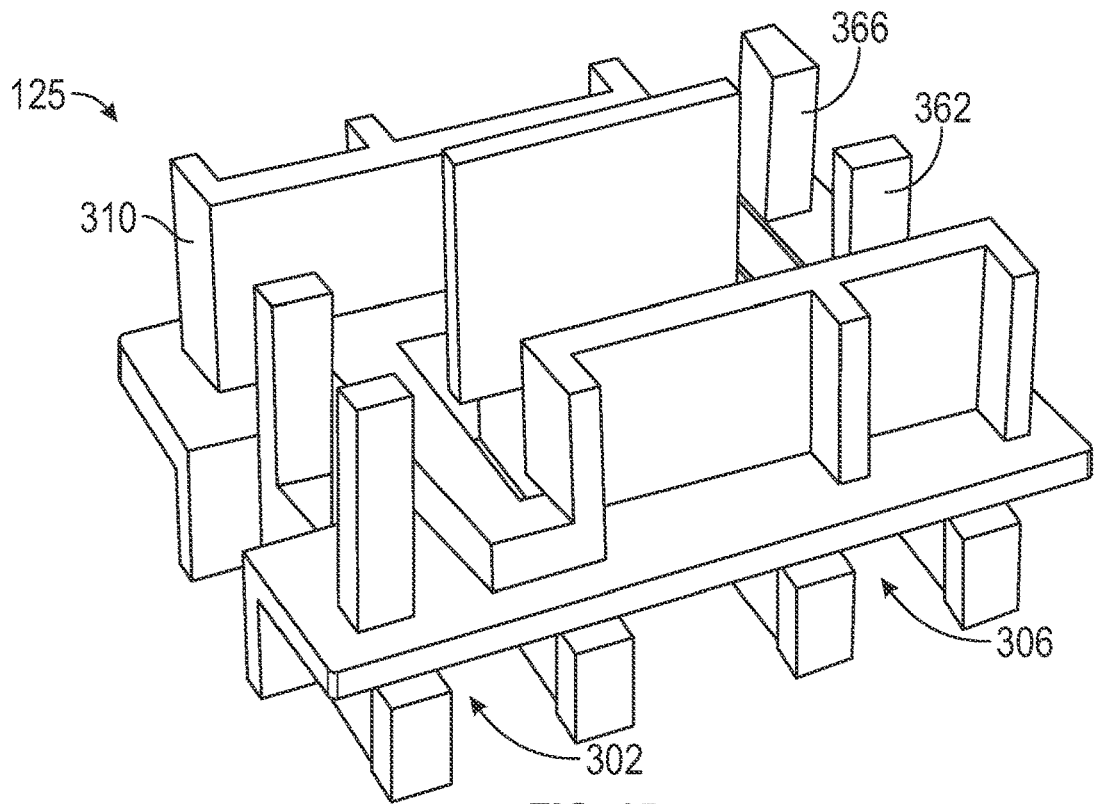
FIG. 15 is a bottom perspective view of the connector of FIG. 14 with all four wires removed.

FIG. 13 is a bottom perspective view of the base portion 310 of connector 125. Base portion 310 has a bottom cover 313 that can be removed to reveal a third channel 362 associated with port 315 and a fourth channel 366 associated with port 320 (see FIG. 15). FIG. 14 is a bottom perspective view of connector 125 with the bottom cover 313 removed from base portion 310. FIG. 15 is a bottom perspective view of connector 125 with the bottom cover 313 removed from base portion 310 and with wire 110, wire 120, wire 121 and wire 122 removed, and with third channel 362 and fourth channel 366 shown. Third channel 362 and fourth channel 366 have teeth 304 and teeth 308, respectively.

Figure 16:
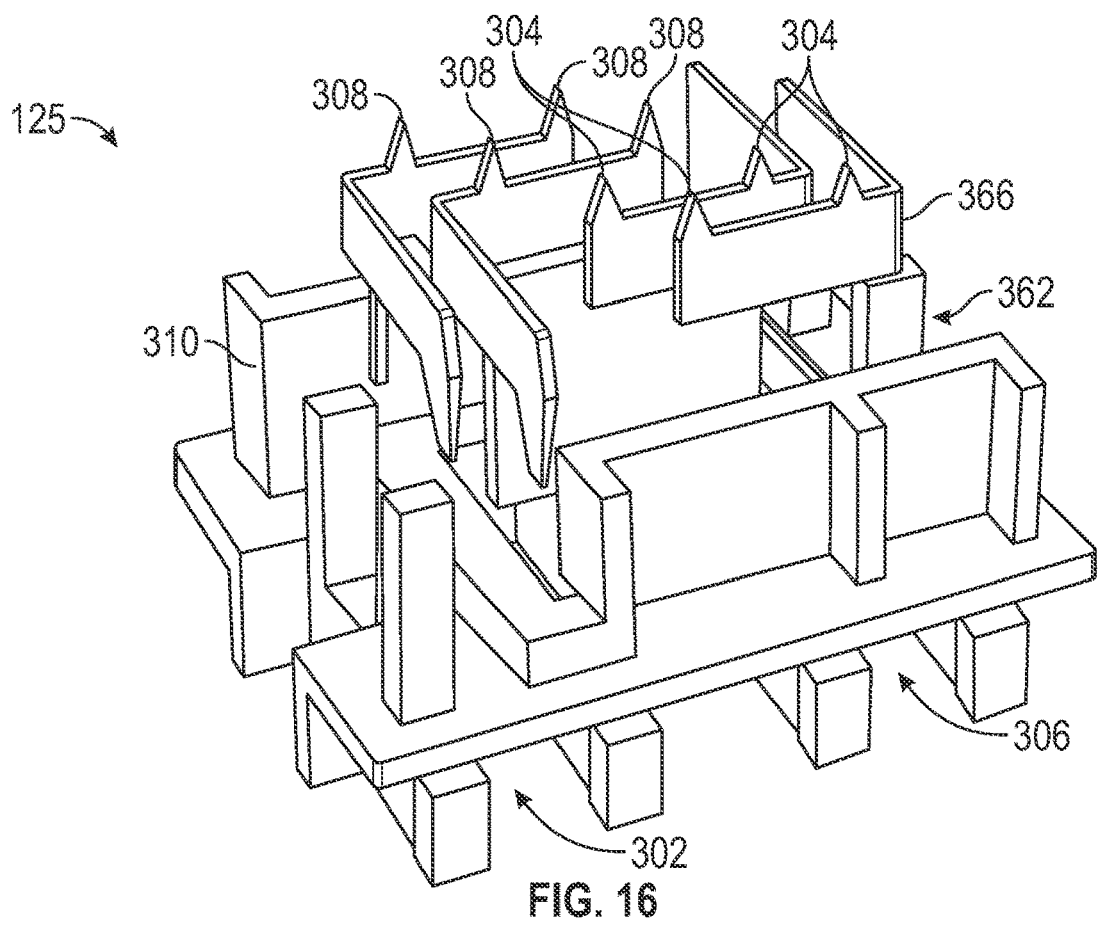
FIG. 16 is a bottom perspective exploded view of the connector of FIG. 15 showing the electrically conductive teeth removed from the channels.

FIG. 16 is a bottom perspective exploded view of connector 125 showing the electrically conductive teeth 304 and 308 removed from channels 362 and 366, respectively. Teeth 304 are formed on an underside of brass angular brackets and opposite to teeth 307 on the top side of the angular brackets. Teeth 304 protrude into channel 362 just as teeth 307 protrude into channel 306, thus electrically coupling channel 306 with channel 362. Likewise, teeth 308 are formed on an underside of brass angular brackets and opposite to teeth 303 on the top side of the angular brackets, thus electrically coupling channel 302 with channel 366. The brass angular brackets have a height that is about the distance of separation between the two levels of channels in base portion 310.

Figure 17:
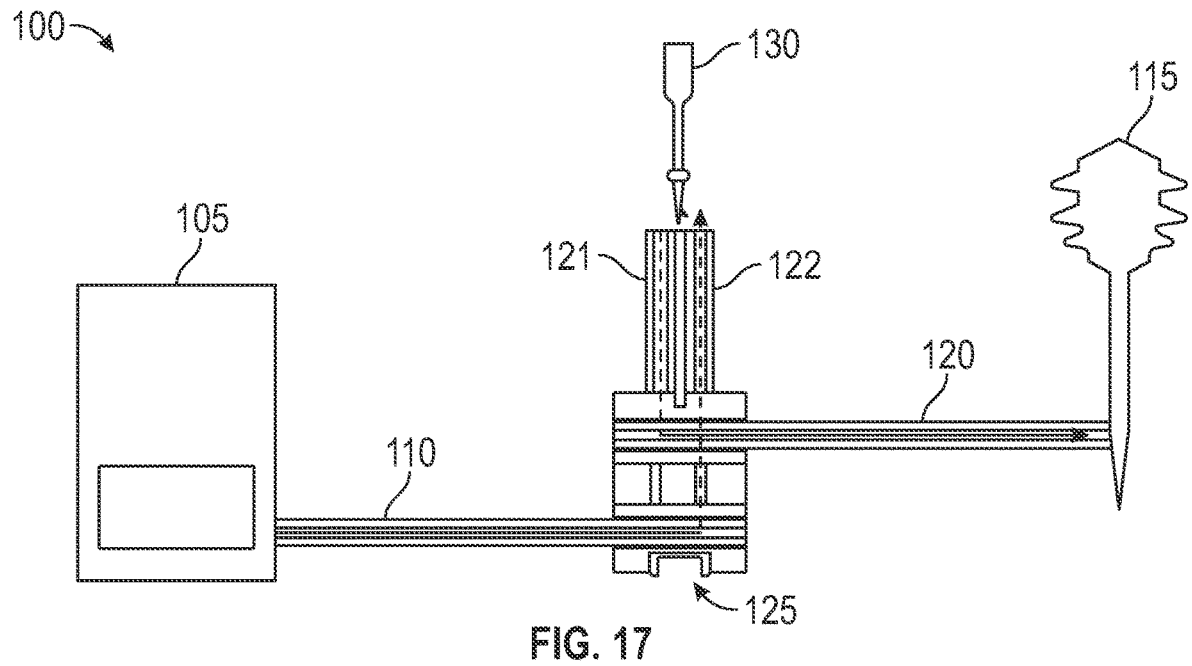
FIG. 17 is a schematic of a wired lighting system with the connector of FIG. 3 connected to a wireless controller.

FIG. 17 is a schematic of wired lighting system 100 comprising transformer 105, connector 125, wireless controller 130, and lighting devices 115, with arrows showing the direction of the current and control signal. A low voltage current originates from transformer 105 and travels to connector 125 via wire 110. The current travels from connector 125 to wireless controller 130 via the first channel 302, teeth 303, teeth 308, fourth channel 366, port 320, and wire 122. The control signal travels from wireless controller 130 back to connector 125 via wire 121, port 315, third channel 362, teeth 304, and the second channel 306. The signal then travels from connector 125 to lighting devices 115 via second channel 306 and wire 120.

Connector 125 can be easily installed in an existing wired lighting system by turning off the power source, cutting the existing wire at a point between the transformer and the lighting devices, placing the transformer wire into the first channel 302, placing the lighting device wire into the second cannel 306, pressing the first cap 301 over first channel 302 to pierce the transformer wire, and pressing the second cap 305 over second channel 306 to pierce the lighting device wire. In this manner, controller 130 can be easily installed into an existing wired lighting system to retrofit the system for remote and wireless control.

Figure 18A:
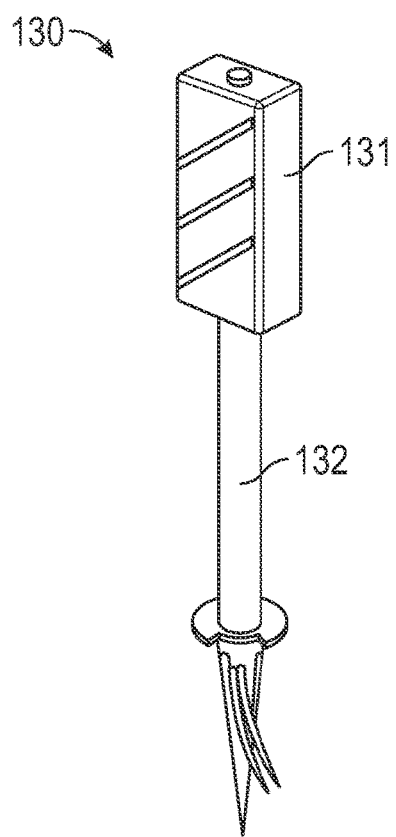
FIG. 18A is a perspective view of the wireless controller in FIG. 17.
Figure 18B:
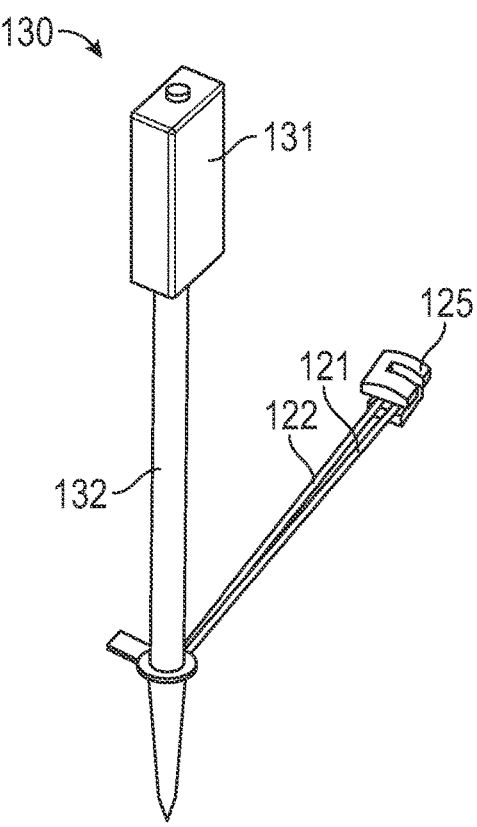
FIG. 18B is a perspective view of the wireless controller and connector of FIG. 17.

FIG. 18A is a perspective view of the wireless controller 130. Wireless controller 130 comprises a transceiver 131 for sending and receiving wireless communications to an electronic device such as a computer or sensor. Wireless controller 130 also comprises a stake 132 for mounting wireless controller 130 to landscape. Alternatively, wireless controller 130 could have another type of fastener (e.g., adhesive, magnet, screws, etc.) for mounting to different types of surfaces or structures. FIG. 18B is a perspective view of wireless controller 130 electrically coupled with connector 125 via wire 121 and wire 122. Wireless controller 130 also houses a memory and processor chip for storing settings and data.

Figure 19:
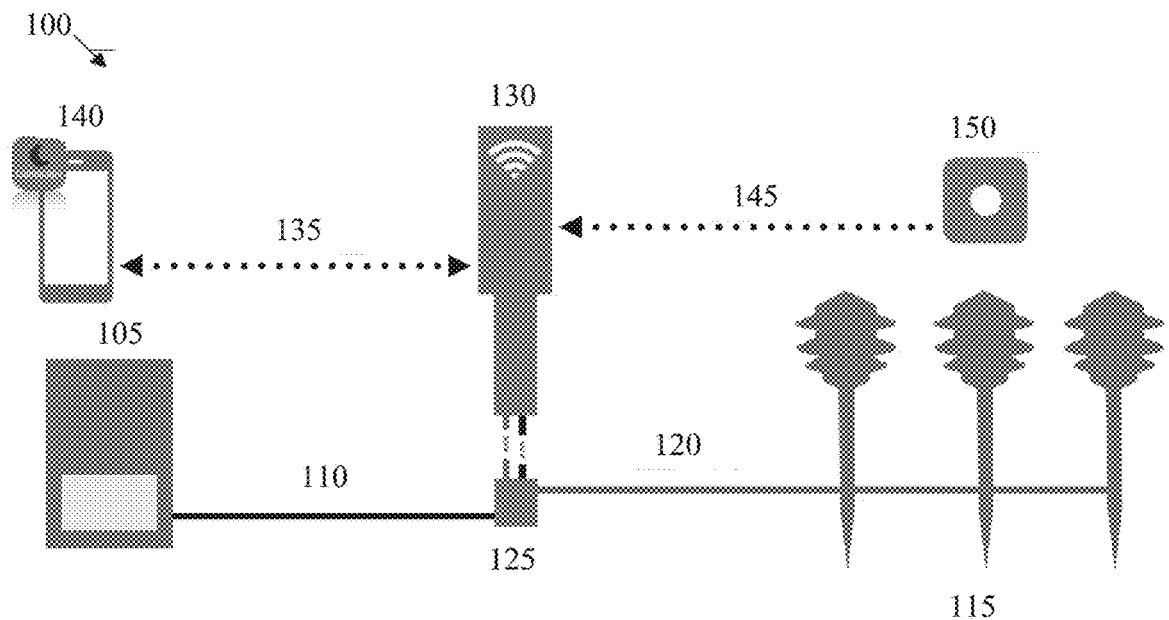
FIG. 19 is a schematic of a wired lighting system with a wireless controller communicatively coupled with a sensor and a computing device.

FIG. 19 is a schematic of wired lighting system 100 with wireless controller 130 communicatively coupled with a computing device 140 via a wireless communication link 135. Wireless controller 130 is also communicatively coupled with a sensor 150 via wireless communication link 145.

Figure 20A:
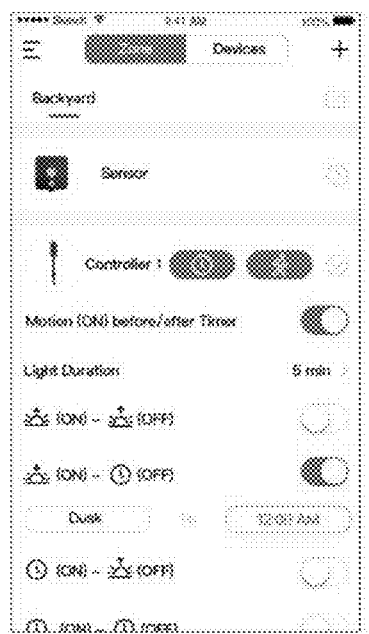
FIGS. 20A-20C are illustrations of a graphical user interface of the computing device of FIG. 19 for controlling timer and motion settings.

FIG. 20A is an illustration of a graphical user interface of the computing device 140. The interface shows a button for zones and devices. On the zone interface, there is a list of zones (e.g., "backyard") and quick buttons for controller, timer, and motion. The clock button next to "controller 1" activates the current timer settings for controller 1. The walking person button next to "controller 1" activates motion detection for controller 1. When the timer button is off, then motion detection will activate lighting at night. When the timer button is on, motion detection will activate lighting outside of the timer or dusk/dawn range setting.

Below "controller 1" is a toggle button for "Motion (ON) before/after timer." When this button is on, motion activation of the light can quickly be deactivated by pressing the walking person button next to "controller 1." The "light duration" setting provides the time that the lights will remain on after motion is detected (e.g., "5 min").

Figure 20B:
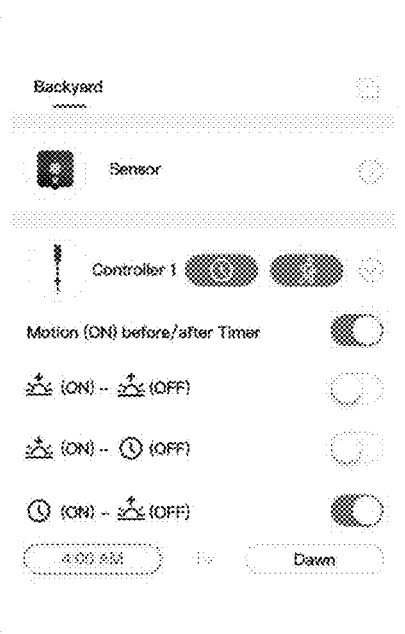

FIG. 20B is an illustration of a graphical user interface of the computing device 140. The interface is similar to FIG. 20A except for different dusk/dawn timer settings. For example, the interface of FIG. 20A is set to turn lights on at dusk and turn off lights at 12 am. The interface of FIG. 20B is set to turn lights on at 4 am and turn lights off at dawn. Various combinations of dusk/dawn timer settings are available from the interface, including dusk-to-time, dusk-to-dawn, time-to-dawn, and time-to-time.

Figure 20C:
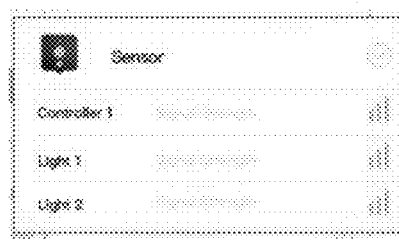

FIG. 20C is an illustration of the sensor setting. Clicking on sensor will display a signal strength between the sensor and the devices.

Figure 21:
FIG. 21 is an illustration of a graphical user interface of the computing device of FIG. 19 for controlling timer and motion settings.

FIG. 21 is an illustration of the graphic user interface with arrows indicating how the selection of "light duration" and "12:00 am" reveal additional windows. From the "light duration settings" window, the user can select 5 min, 10 min, 15 min, 20 min, and 30 min. From the "Set Time" window, the user can select hours, minutes, and AM/PM.

Figure 22:
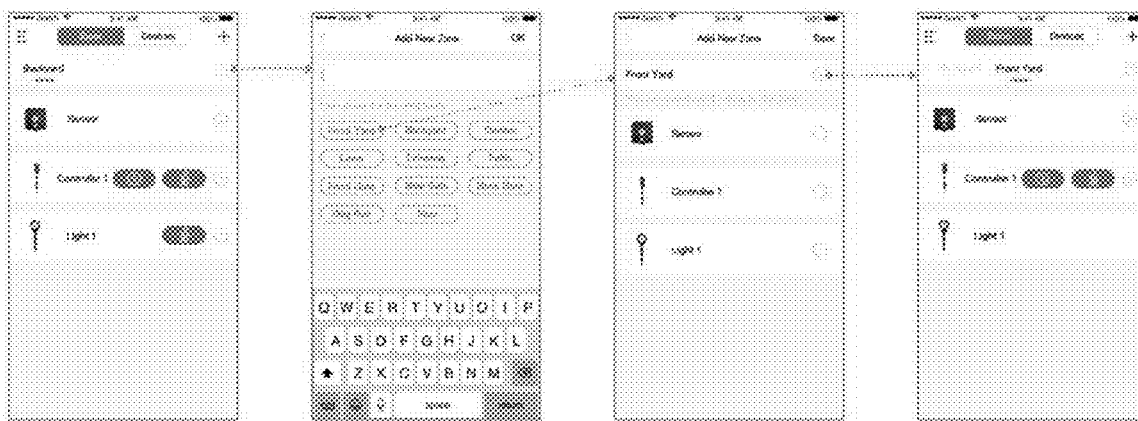
FIG. 22 is an illustration of a graphical user interface of the computing device of FIG. 19 for adding new zones and renaming zones.

FIG. 22 is an illustration of the graphical user interface with arrows indicating how to add new zones. Pressing the "+" symbol opens a window for adding a new zone or device. The name of the new zone or device can be edited using the paper and pencil icon to the right of the zone or device name (e.g., "backyard").

Figure 23:
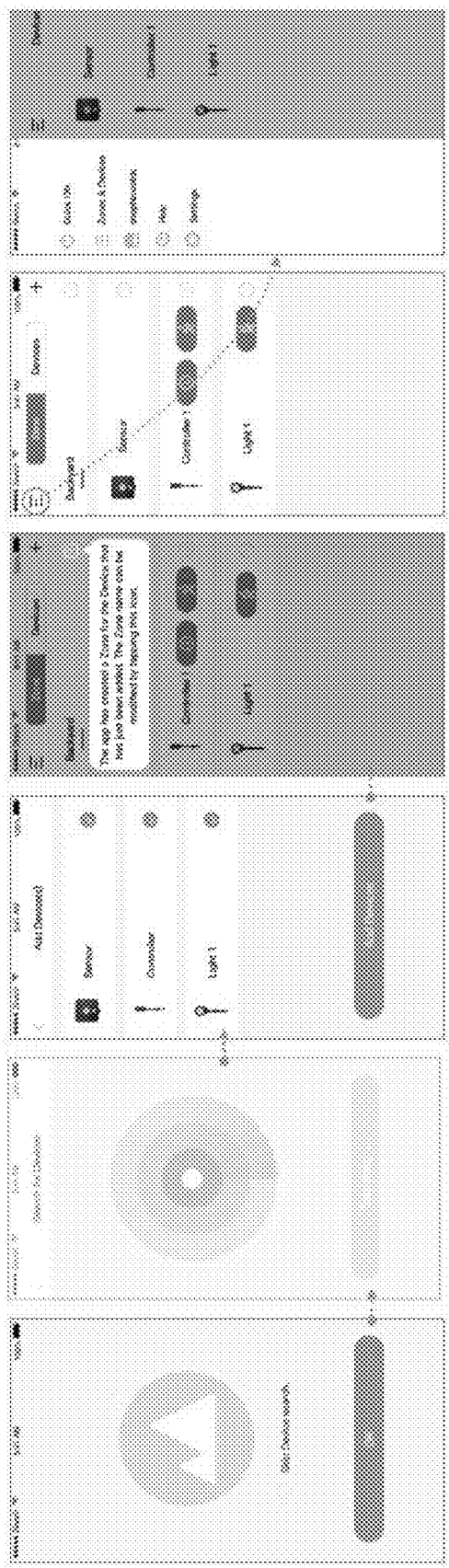
FIG. 23 is an illustration of a graphical user interface of the computing device of FIG. 19 for searching for new devices and adding new devices.

FIG. 23 is an illustration of the graphical user interface for adding new devices to the lighting system. The user can select "ok" to search for new devices. The app will search for available devices either via a wired or wireless connection. When the first device is added, a first zone is automatically created for that device.

Figure 24:
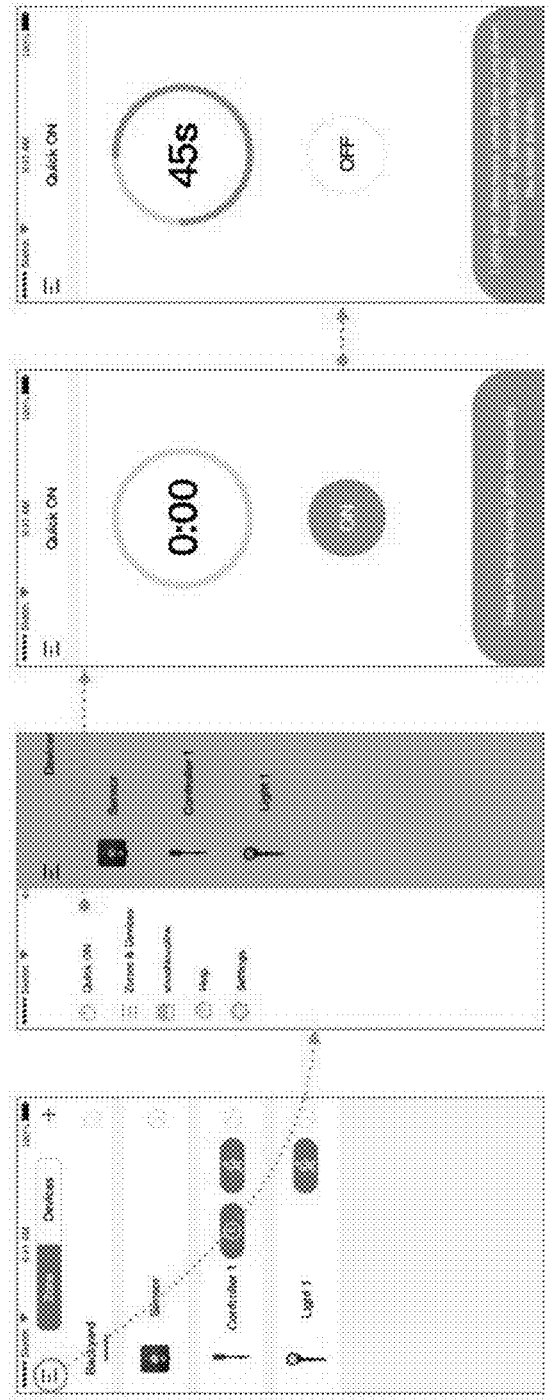
FIG. 24 is an illustration of a graphical user interface of the computing device of FIG. 19 for quickly turning all devices on and off.

FIG. 24 shows a continuation of the graphical user interface of FIG. 23. When the menu icon in the top left is selected, a left panel window is displayed with a "Quick ON" or button. When this button is selected, a window with a timer and an "ON" button is shown. Selecting the "ON" button will turn lights on until the timer runs out. The user can select the "OFF" button to turn the lights off before the timer runs out.

Figure 25:
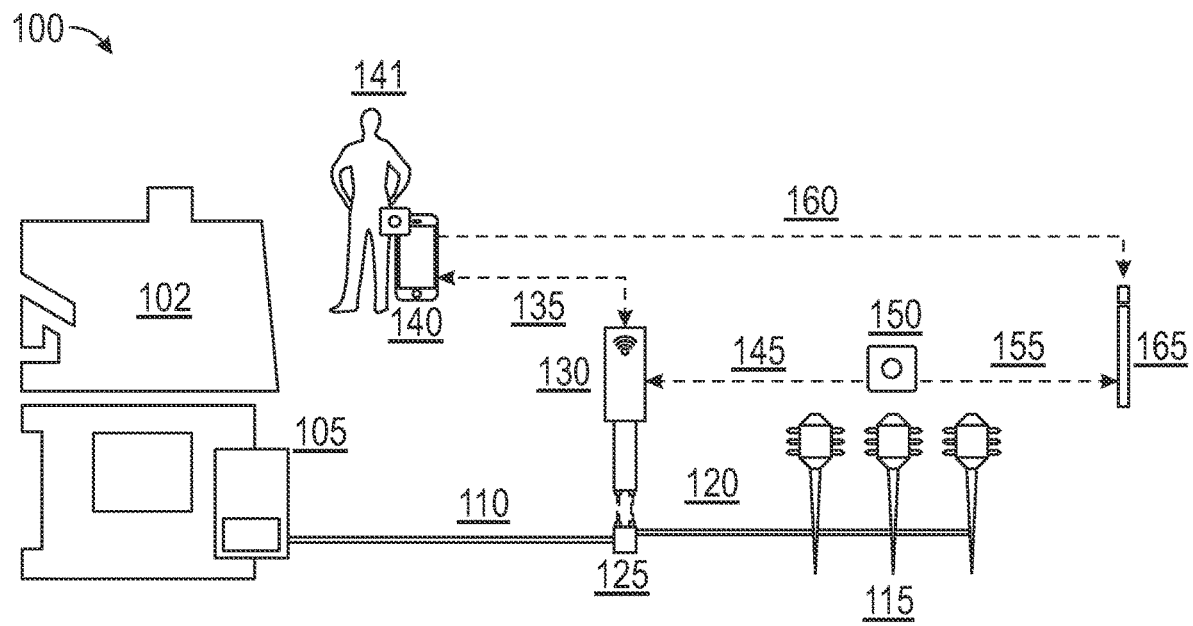
FIG. 25 is a schematic of a wired lighting system being wirelessly controlled by a user via the wireless controller and the connector of FIG. 3.

FIG. 25 is a schematic of wired lighting system 100 installed at a house 102. House 102 provides an alternating current (AC) power supply and transformer 105 converts the AC current into a lower voltage power source for powering wired lighting system 100. Wired lighting system 100 includes a wireless controller 130, which not only allows for wired lighting devices 115 to be controlled wirelessly, but also allows for the expansion of wired lighting system 100 to include additional wireless components such as wireless lighting device 165. Wireless lighting device 165 can be directly controlled by a user 141 via computing device 140 and wireless communication link 160. Alternatively, wireless lighting device 165 can be controlled by user 141 using computing device 140 and wireless controller 130 via wireless communication link 145, sensor 150, and wireless communication link 155. The addition of lighting device 165 to wired lighting system 100 allows for existing wired systems to be expanded to include newer wireless lighting devices and components. Moreover, it is contemplated that wired lighting system 100 can be further modified to include multiple controllers 130 to control different groups of lighting devices 115 with different on/off program cycles.

Figure 26:
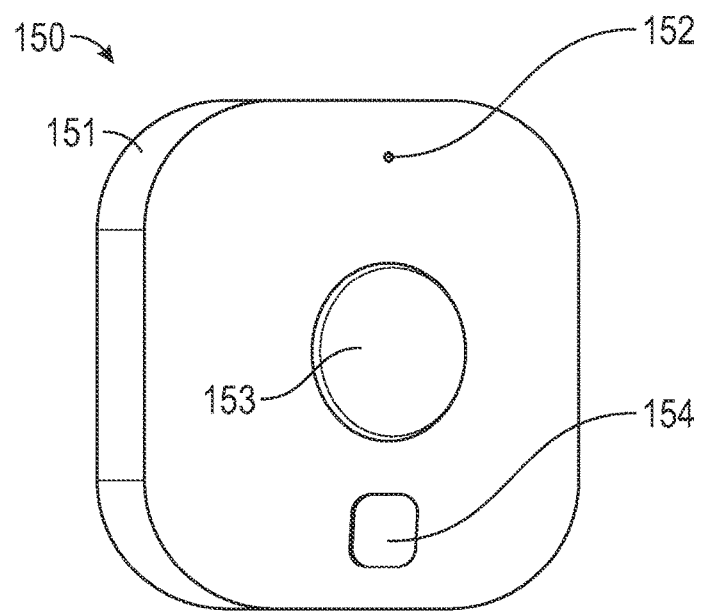
FIG. 26 is a front perspective view of the sensor of FIG. 19 and FIG. 25.

FIG. 26 is a front perspective view of sensor 150. Sensor 150 has a housing 151 for storing and protecting electronic components from weather conditions. Sensor 150 also has a light sensor 152 and a motion sensor 153. Sensor 150 also has a button 154 for turning the device on/off and for pairing the device with the wireless controller 130 to establish communication link 145. Button 154 can also be used to pair sensor 150 with other devices such as wireless lighting device 165.

Figure 27:
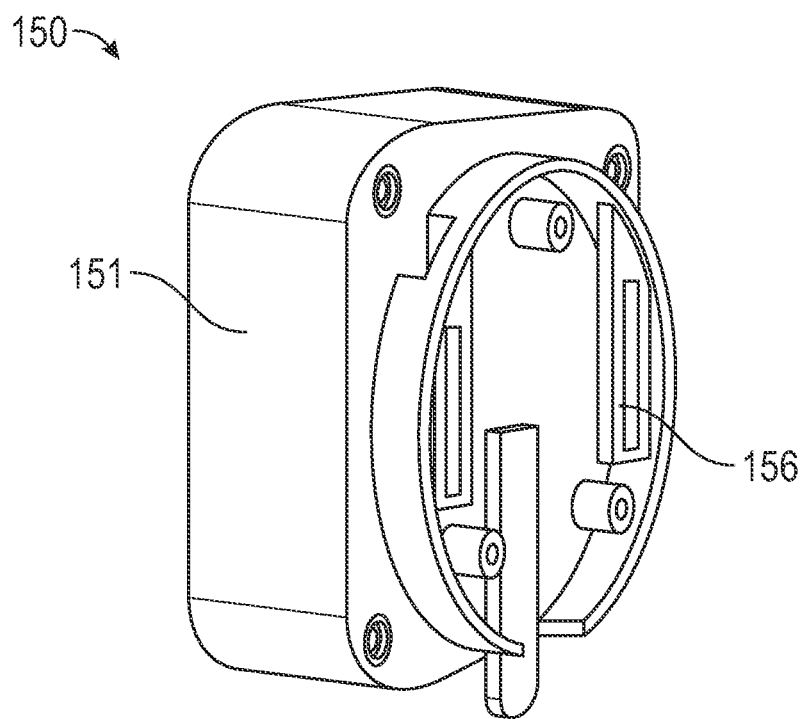
FIG. 27 is a rear perspective view of the sensor of FIG. 19 and FIG. 25.

FIG. 27 is a rear perspective view of sensor 150 showing a removable rear cover 156 and fastening features for mounting sensor 150 to a surface.

Figure 28:
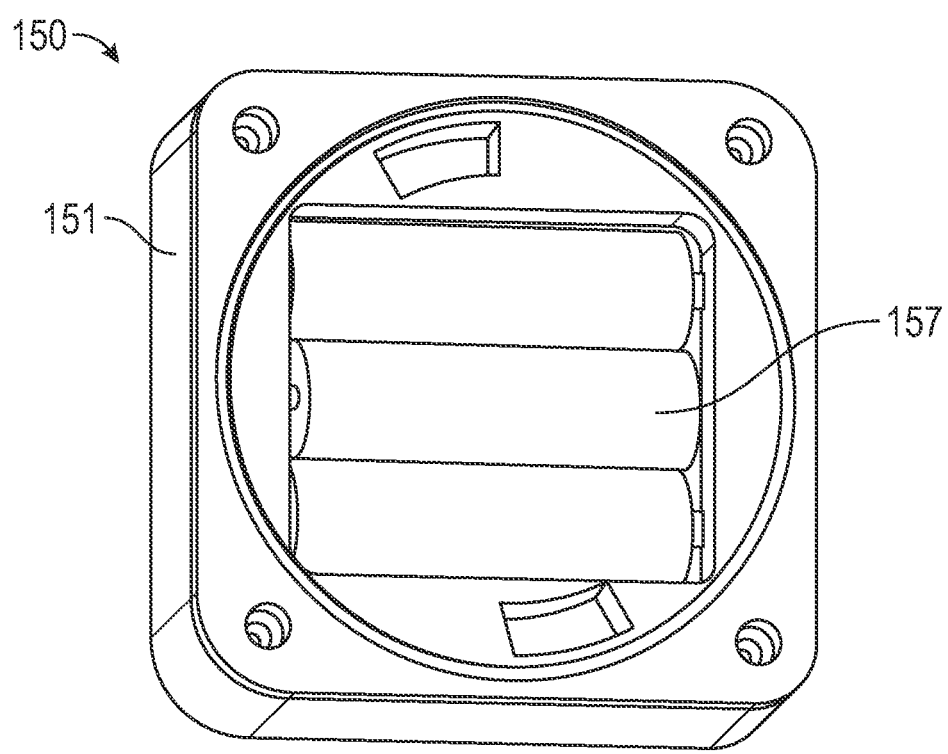
FIG. 28 is a rear perspective view of the sensor of FIG. 19 and FIG. 25 with a rear cover removed.

FIG. 28 is a rear perspective view of sensor 150 with rear cover 156 removed to reveal batteries 157.

Figure 29A:
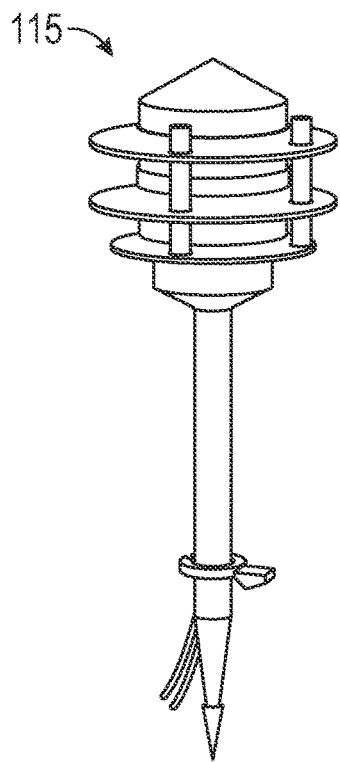
FIG. 29A is a perspective view of a lighting device of FIG. 19 and FIG. 25.

FIG. 29A is a perspective view of a lighting device 115.

Figure 29B:
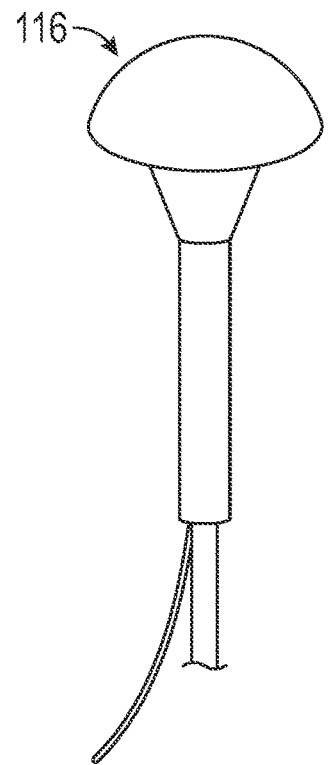
FIG. 29B is a perspective view of an alternative embodiment of a lighting device.

FIG. 29B is a perspective view of a lighting device 116 having an alternative exterior design to lighting device 115 but similar function.

Figure 30:
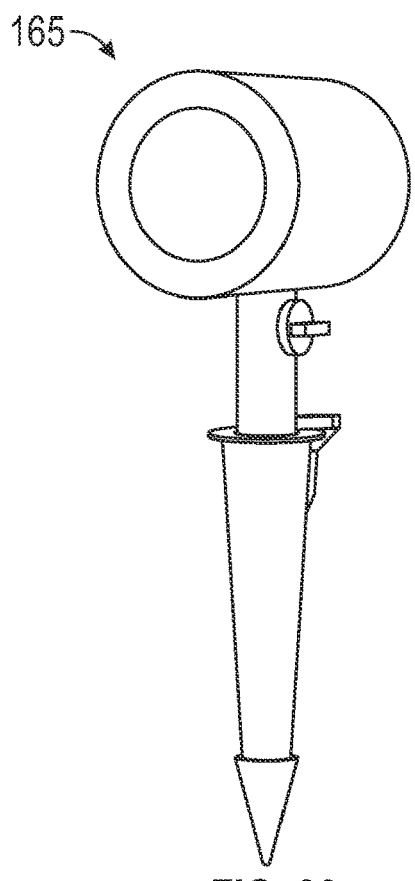
FIG. 30 is a perspective view of a wireless lighting device.

FIG. 30 is a perspective view of a wireless lighting device 165. Wireless lighting device 165 does not require any external wiring for power or for communicating with wireless controller 130. Instead, wireless lighting device 165 includes a power supply (e.g., solar powered, or batteries) and a transceiver for sending and receiving communication signals with other devices, including wireless controller 130, sensor 150, and computing device 140.

Figure 31:
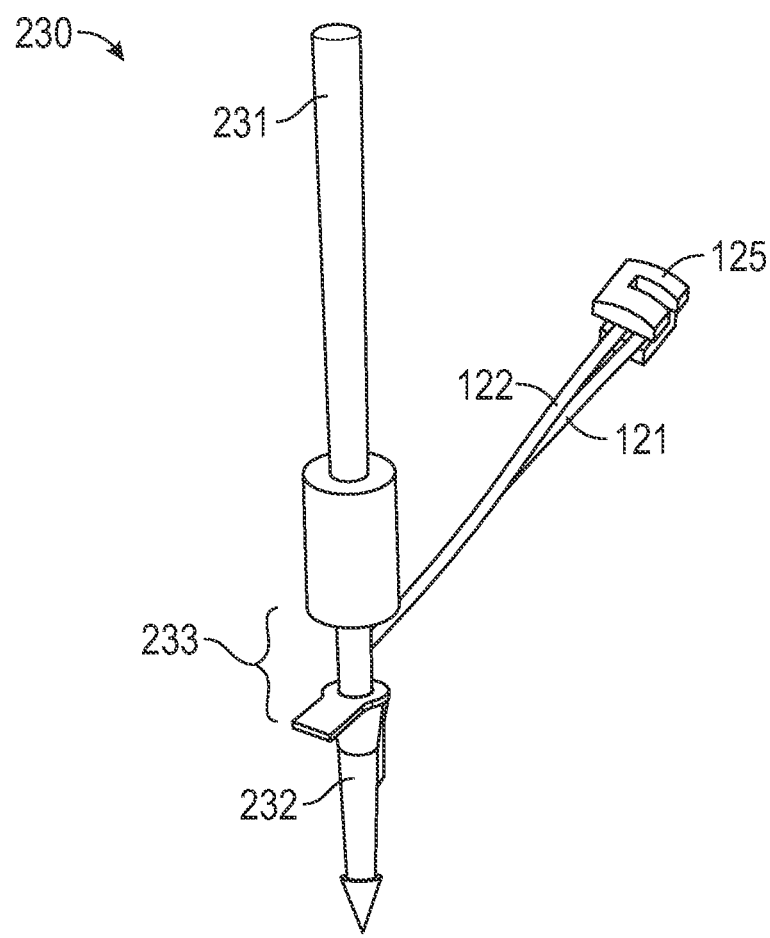
FIG. 31 is a top perspective view of another embodiment of a wireless controller.
Figure 32:
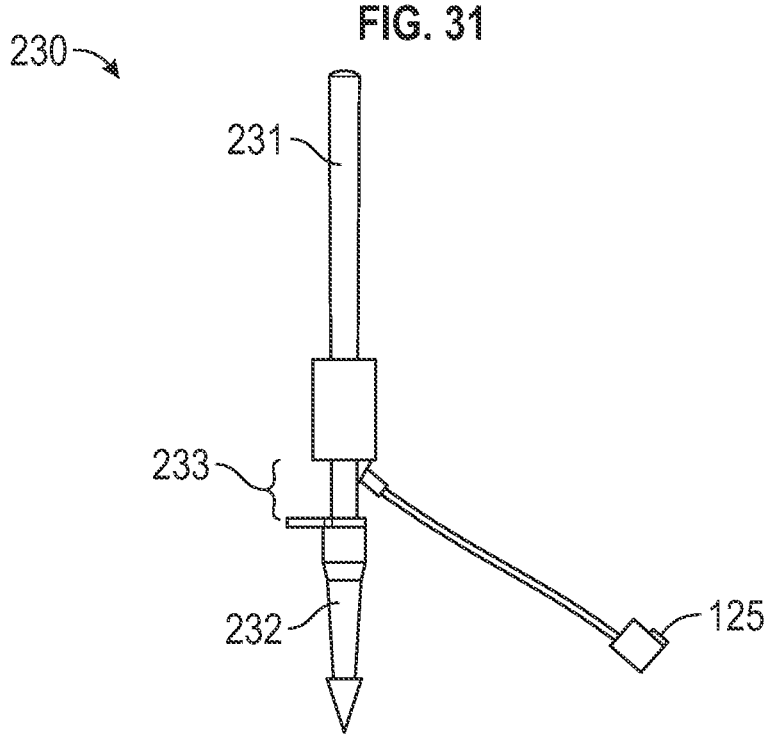
FIG. 32 is a side perspective view of the wireless controller of FIG. 31.

FIG. 31 is a top perspective view of another embodiment of a wireless controller 230. Wireless controller 230 comprises a transceiver 231 for sending and receiving wireless communications to an electronic device such as a computer or sensor. Wireless controller 230 also comprises a stake 232 for mounting wireless controller 230 to landscape. Wireless controller 230 is electrically coupled with connector 125 via wire 121 and wire 122 at a point located above the head of stake 232 by a distance 233. Distance 233 can be 5 cm, 10 cm, 20 cm or greater, to keep wire 121, wire 122, and any related electronic components above any rainwater and/or flooding. FIG. 32 is a side perspective view of wireless controller 230.

Figure 33:
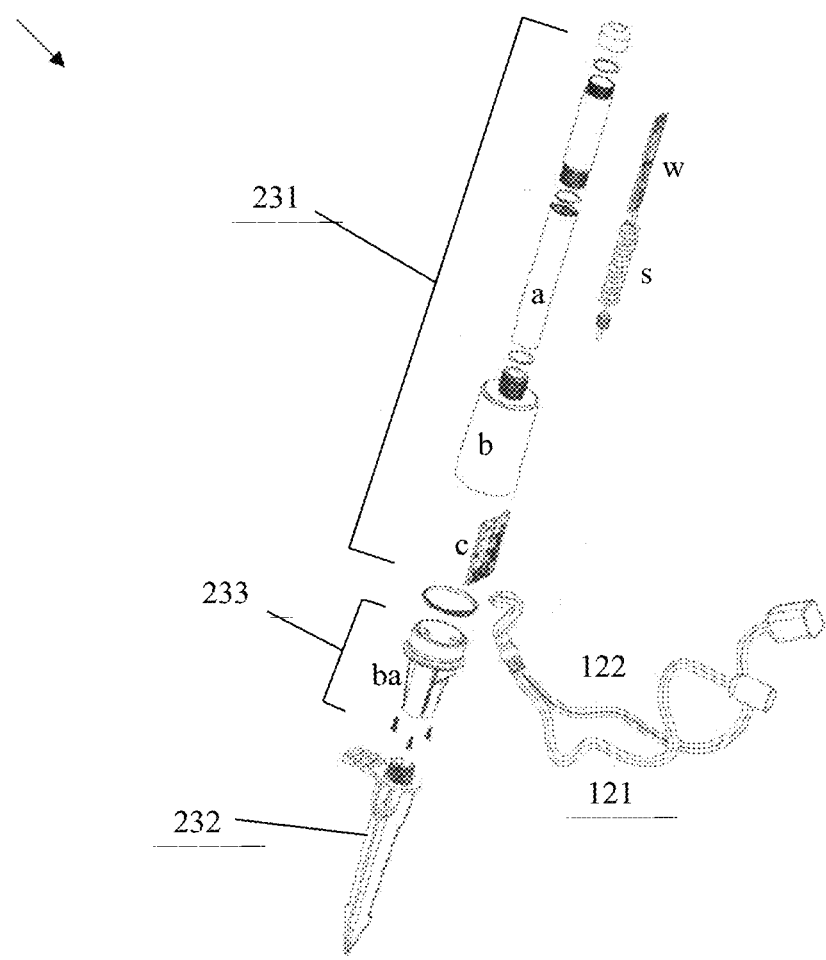
FIG. 33 is an exploded view of the wireless controller of FIG. 31.
Figure 34:
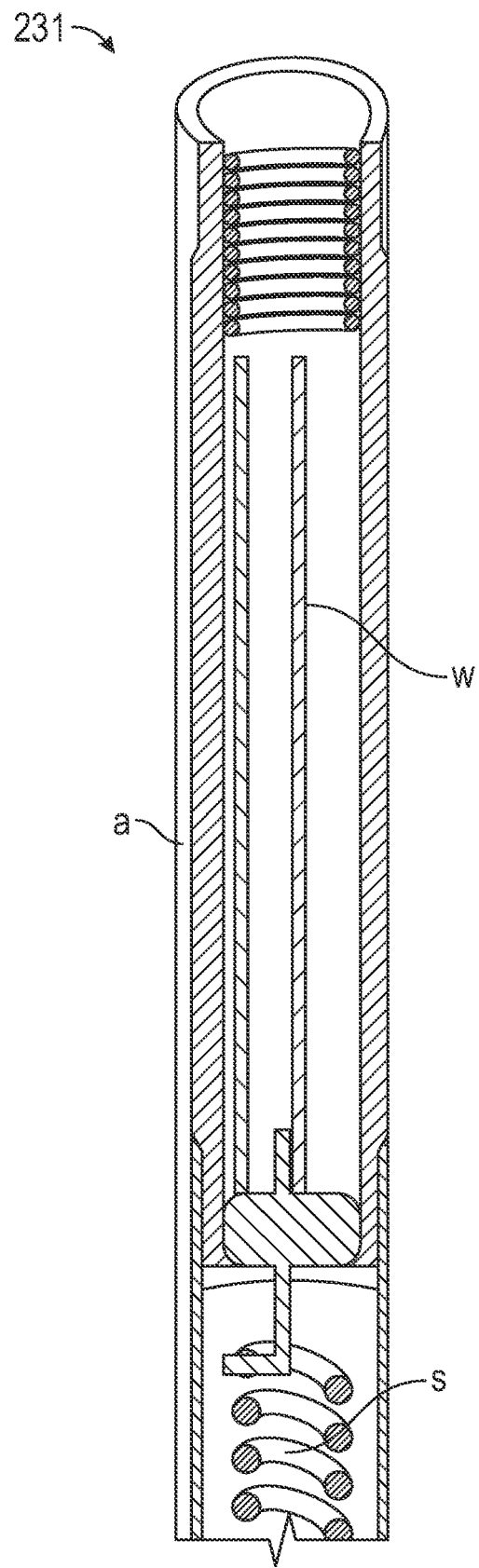
FIG. 34 is a cross-sectional view of the wireless controller of FIG. 31.

FIG. 33 is an exploded view of wireless controller 230. Transceiver 231 comprises an elongated antenna housing (a) coupled with a controller body (b). Controller body (b) houses a processor, memory, and non-transitory storage medium for saving user settings, user profiles, and lighting programs. FIG. 34 is a cross-sectional view of transceiver 231, showing the wireless connection (w) and signal wire (s) disposed inside the antennal housing (a). The electronics are sealed inside the antenna housing (a) using silicon seal rings, threaded fasteners, and a cap. This design provides improved insulation of the electronics from weather protection. The design also advantageously places the antenna portion of the controller highest above ground for better signaling and places the controller body (b) (with the electrical components) lower to the ground to be less obtrusive. Another advantage of the present design is that the controller base (ba) separates the controller body (b) from the head of stake 232 to lower possibility of damage while hammering the stake and to keep the electronics above ground, and above any rain water and/or flooding.

Figure 35:
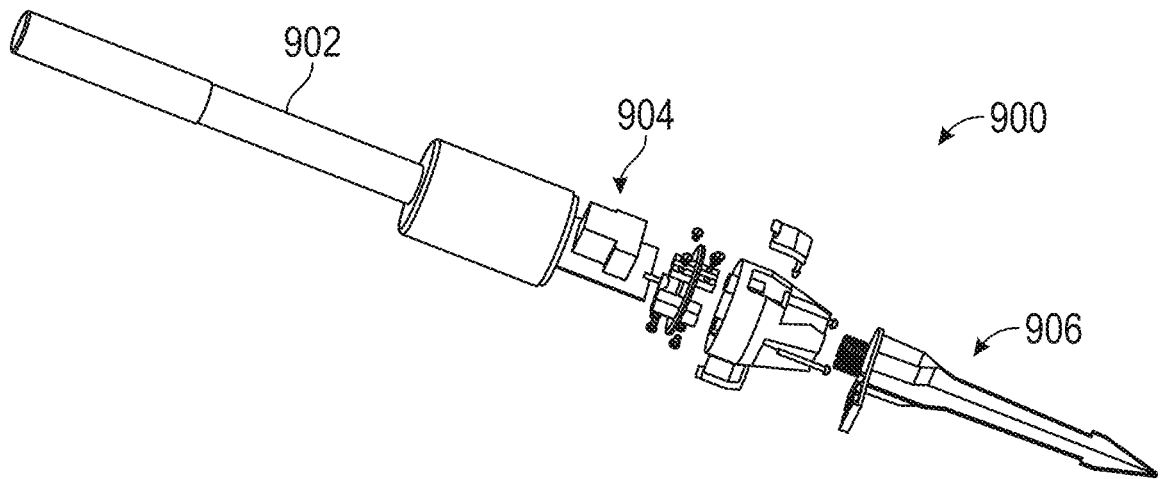
FIG. 35 is an exploded view of another embodiment of the wireless controller.
Figure 36:
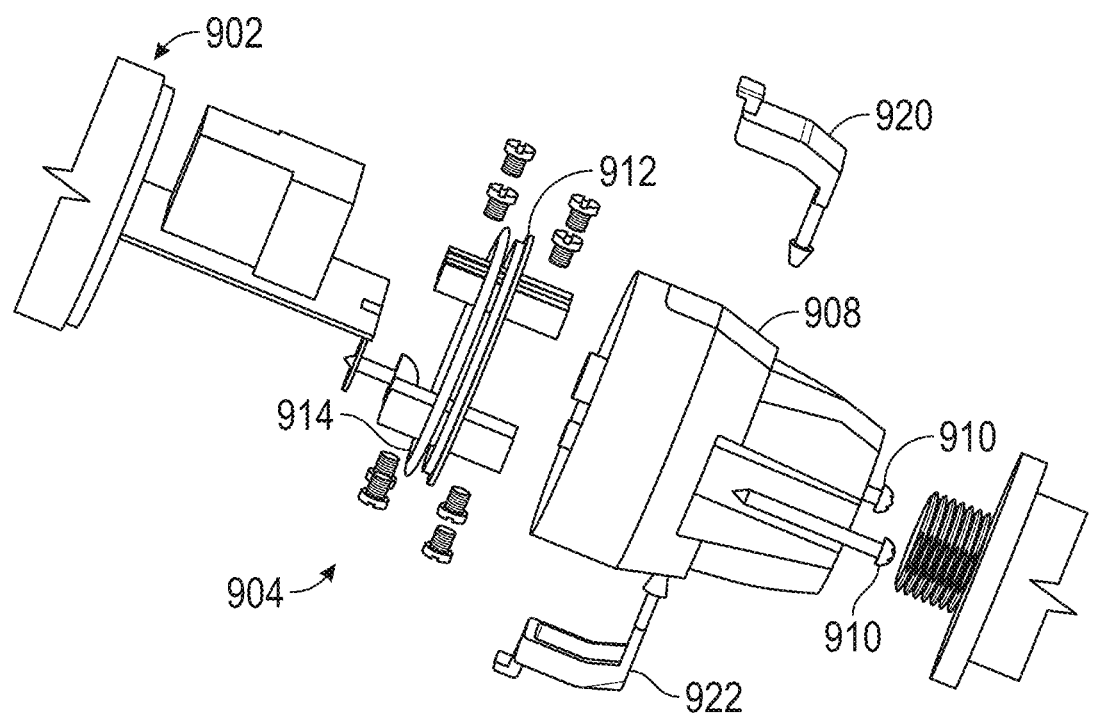
FIG. 36 is an exploded view of the controller body of the wireless controller of FIG. 35.

FIG. 35 is an exploded view of another embodiment of the wireless controller 230. The wireless controller 900 includes a transceiver 902 coupled to a controller body 904, which is in turn connected to the head of stake 906. FIG. 36 provides a close-up view of the controller body 904 of the wireless controller 900 of FIG. 35. The exploded view of FIG. 36 illustrates a cover 908 of the controller body that can be secured on one end of the transceiver 902 using screws 910 (or any other type of known mechanisms) Inside the cover 908 can be two slots 912, 914 for receiving wires such as wires 121, 122 of FIG. 17 for connecting the wireless controller 230 to a connector (not shown in FIG. 36). The cover 908 can have two caps 920, 922 when removed expose the slots 912, 914 for receiving the wires.

Figure 37:
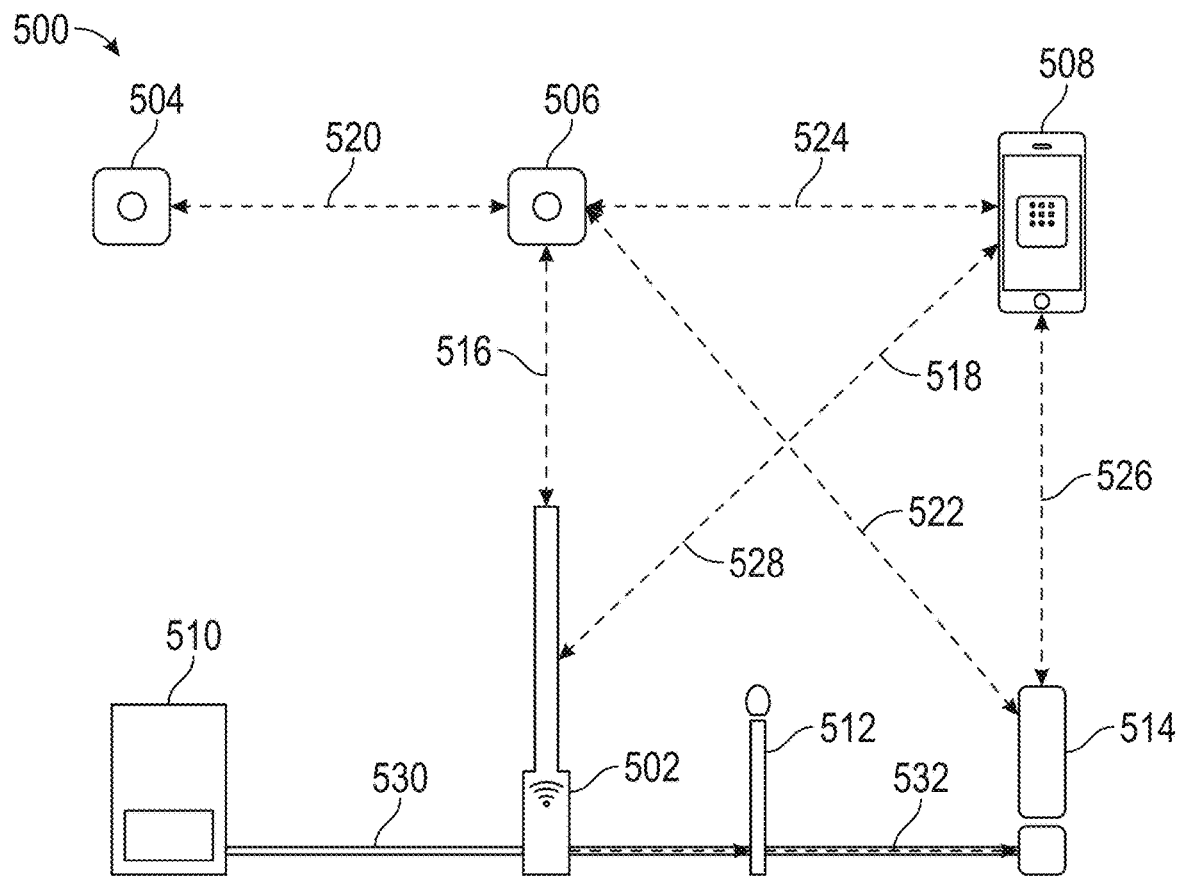
FIG. 37 is a block diagram illustrating the exemplary components of a network of devices, according to an embodiment of the disclosure.

In another aspect of the disclosure, a system and method of controlling the settings of one or more devices (e.g., lighting devices) is disclosed. FIG. 37 is a block diagram illustrating an exemplary network of devices, according to an embodiment of the disclosure. The network 500 can include a controller 502, one or more wireless devices 504, 506, remote (or mobile) device 508, transformer 510, and one or more wired devices 512, 514. The controller 502 can be the controller 230 of FIGS. 31-34. The wireless devices 504, 506 can be wireless sensors, wireless lights, or sensor-light combo devices (one device including both a sensor and a light). A wireless sensor can be a motion sensor capable of detecting motion within a certain range, a light sensor (or photo sensor) capable of detecting visible light (e.g., ambient light), or sound sensor capable of detecting sound waves.

For example, wireless device 504 can be sensor 150 of FIGS. 25-28. A wireless lighting device can be any light that can be controlled via a wireless connection. An example is the wireless lighting device 165 of FIG. 30. Wireless devices 504, 506 can also each include a sensor and a light. The mobile device 508 can be a smartphone, tablet, laptop computer, wearable device, or any other type of computing devices that can connect to a network and run programs. The transformer 510 can be the transformer 105 of FIGS. 17, 19, and 25. The one or more wired devices 512, 514 can be low-voltage devices 512 (e.g., lighting devices 115 of FIGS. 19, 25, 29A and 29B) or other low-voltage wired devices with wireless connectivity 514.

The wireless devices 504, 506, the mobile device 508, the controller 502, and one or more of the wired devices 512, 514 can be connected to each other via any type of wireless connections including but not limited to Bluetooth, Wi-Fi, and 433 MHz (LPD433) radio frequency (RF) connections. In the embodiment shown in FIG. 37, the controller 502 can be connected to the wireless device 506 via a Bluetooth connection 516. The Controller 502 can be connected to the mobile device 508 via a Bluetooth connection 518. The wireless connection 520 between wireless devices 504 and 506 can be either a Bluetooth or 433 MHz RF connection. The wireless device 506 can also be connected to one or more of the wired devices with wireless connectivity (e.g., wired device 514) via a Bluetooth or 433 MHz RF connection 522. The wireless device 506 can be connected to the mobile device 508 via a Bluetooth connection 524. The mobile device 508 can be connected to the wired device 514 via a Bluetooth connection 526. The mobile device can also be connected to the controller 502 via a Bluetooth connection 528. The controller 502 can also connect the transformer 510 and one or more wired devices 512, 514 via wired connections 530, 532. The wired connections 530, 532 can be enabled via a connector such as connector 125 of FIG. 3 as described above.

It should be understood that there may be additional wireless connections among the devices of FIG. 37 that are not illustrated in the figure. It should also be understood that some or all wireless connections discussed above can be substituted by wired connections. That is, each of the devices shown in FIG. 37 can have either wireless or wired connectivity or both. RF transmission with frequencies different from 433 MHz can also be used. It should also be understood that network 500 can be scaled to include additional devices not shown in FIG. 37 and that some of the devices of FIG. 37 can be omitted or replaced by other types of devices in alternative embodiments of the disclosure. To be clear, other embodiments of the network can include any number of wireless sensors, lights, controllers, and wired lights.

The exemplary network of devices of FIG. 37 can provide an intelligent customizable zone-based lighting solutions for indoor and/or outdoor use. In one example, the wireless device 504, 506 can be motion sensors or sensor-light combo devices. The controller can include a light detector capable of determining dusk and/or dawn based on the amount of ambient light detected. The low-voltage device 512 can be a wired landscape light. The other low-voltage wired device 514 can be a wired landscape light also having wireless connectivity. The light of the wireless sensor-light combo devices 504, 506 and landscape light 512, 514 can be turned on, off, dimmed, and/or brightened based on one or more signals received from the wireless motion sensors of the devices 504, 506, the controller 502, and/or the setting information from mobile device 508.

For example, when the motion sensor of wireless device 504 detects motion, it can transmit a signal via wireless connection 516 to controller 502, which, in response to receiving the signal, can turn on the low-voltage landscape lights 512, 514 via the wired connection 532. The motion sensor 504 can also transmit a wireless signal to the low-voltage landscape light device 514 directly via wireless connection 522 to change its setting. The light sensor of the controller 502 can detect a certain amount of ambient light (e.g., an amount that indicates that it is dawn). When the light sensor is triggered, the controller 502 can change the settings of the low-voltage landscape lights 512, 514 via the wired connection 532 and the settings of any wireless lights integrated in sensor-light combo devices 504, 506 via the wireless connection 516. In addition, the transformer can change, based on signals received from other devices such as the controller 516 on the network, the setting of the low-voltage landscape lights 512, 514 via connections 530, 532.

The mobile device 508 can be programmed to receive user inputs via interfaces such as those shown in FIGS. 20-24 and adjust the settings of other devices on the network in response to these user inputs. As illustrated in FIGS. 20-24 and discussed above, the program (or app) on the mobile device allows the user to select a zone (if multiple zones such as driveway, front lawn, etc. have been defined), set conditions for automatically turning on and off the lights within the selected zone, light on and/or off duration, and program the settings of one or more sensor(s). The conditions for automatically turning on (or brightening) the light (s) can include, for example, a particular time of the day, when dusk is detected (as determined by the light sensor of the controller 502), when motion is detected by one or more of the motion sensors, and a combination of two or more of these conditions. The conditions for automatically turning off (or dimming) the light(s) can include, for example, a particular time of the day, when dawn is detected (as determined by the light sensor of the controller 502), when the light duration expires, and a combination of two of more of these conditions. The light(s) can also be turned on, off, dimmed, brightened etc. manually by a remote user using the app on the remote device 508.

By allowing the user to changing the settings of the app, the mobile device can transmit signals to the other devices on the network to provide different settings for the lights within a zone. Example 1: the lights 512, 514 can be set to be on from dusk to dawn by programming the transformer 510 to activate the lights when insufficient ambient light is detected by the light sensor on the controller 528 (indicating that it's dusk) and deactivate the lights when sufficient ambient light is detected by the light sensor (indicating that it's dawn). In some embodiments, the light sensor can be a standalone device or part of another device on the network. Example 2, the lights can be set to be on from dusk to a set time by programming the transformer to activate lights when insufficient ambient light is detected by the light sensor on the controller 528 and deactivate the lights at a specific time (e.g., 1:00 am) set by the app on the mobile device. Example 3, the lights can be set to be on from a specific time set by the app to dawn (e.g., when sufficient ambient light is detected by the light sensor). Example 4: the lights can be set to activated and deactivated at specific times (e.g., 8:00 pm to 1:00 am) by using the app on the mobile device 508. The various exemplary settings discussed above can be activated using the user interface of FIG. 20B.

In some embodiments, the program provides an addition "Motion" option (e.g., "Motion (ON) before/after timer" of FIG. 20) to allow further customization of the light settings. FIG. 36 illustrates an example of the lights set to a dusk-to-time (or time-to-time) operation, with motion activated. First, the lights can be set to a dusk-to-time (or time-to-time) operation, as described in the second and forth examples provided above, respectively, with the off time set to 1:00 am (680). During the period between dusk (or 6:00 pm) and 1:00 am, the lights will remain on regardless of any output from any of the sensors or other devices on the network. That is, any output from the motion sensors, light sensors, or any other sensors connected to network would not change the setting of the lights (e.g., turning the lights off).

Figure 38:
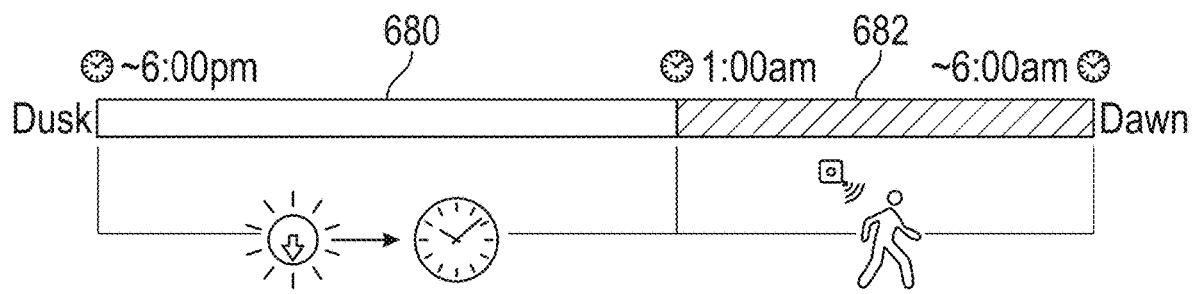
FIG. 38 is a diagram illustrating the exemplary setting of an operation of a light with motion activation, according to an embodiment of the disclosure.

In some embodiments, the sensors can be deactivated during that period. If the "Motion" option is turned on, any motion detected by one or more of the motion sensors connected to the network would activate the lights when the lights are in an "off" setting at any time between dusk and dawn. For example, referring to FIG. 38, the lights are set to off after 1:00 am based on the dusk-to-time (or time-to-time) setting. After 1:00 am, during the period 682 between 1:00 am and dawn, the lights can be activated in response to one or more motion sensors detecting motion. This can help conserve electricity during the quietest time (e.g., 1:00 am-dawn) by defaulting the lights to their "off" state, but at the same time still provide warning and/or deterrence with the motion-activated light setting. None of the traditional lighting network solutions permits this type of hybrid setting. It should be understood that the "Motion" option can be set so that the lights are motion activated before a particular time followed by a time-to-dawn or time-to-time setting (essentially switching 682 and 680 in FIG. 36).

Figure 39:
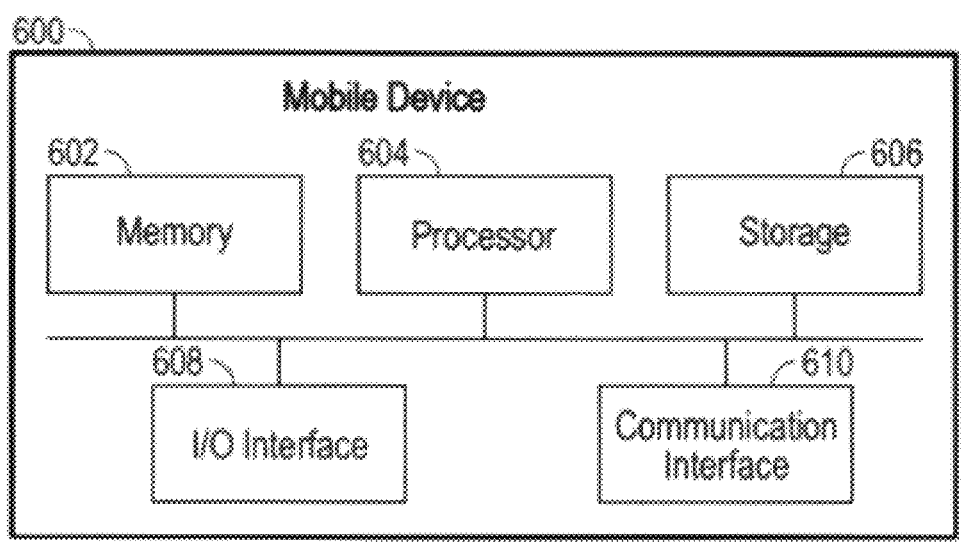
FIG. 39 is a diagram illustrating the exemplary components of a mobile device for configuring the setting of multiple devices, according to an embodiment of the disclosure.

FIG. 39 illustrates the exemplary components of a mobile device 508 of FIG. 37. The mobile device can include a memory 602, a processor 604, a storage 606, an input/output (I/O) interface 608, and a communication interface 610.

Processor 604 may include any appropriate type of general-purpose or special-purpose microprocessor, digital signal processor, or microcontroller. Processor 604 may be configured to receive data and/or signals from a user and other devices on the network and process the user input and received data and/or signals to determine the settings of one or more devices such as motion sensors and lighting devices.

Processor 604 may execute computer instructions (program codes) stored in memory 602 and/or storage 606, and may perform functions in accordance with exemplary techniques described in this disclosure. Memory 602 and storage 606 may include any appropriate type of mass storage provided to store any type of information that processor 604 may need to operate. Memory 602 and storage 606 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 602 and/or storage 606 may be configured to store one or more computer programs that may be executed by processor 604 to perform exemplary lighting control functions disclosed in this disclosure. For example, memory 602 and/or storage 606 may be configured to store program(s) that may be executed by processor 604 to determine when to turn on or off a motion sensor, an ambient light sensor, and/or a lighting device on the network. The program(s) may also be executed by processor 604 to provide an interface for interacting with a user.

Memory 602 and/or storage 606 may be further configured to store information and data used by processor 604. Memory 602 and/or storage 606 may be configured to store one or more programs (e.g., apps) for controlling the lighting devices on the network. The program(s) when executed by the processor 604 can transmit signals to one or more other devices on the network to change the settings of these devices, as described in the embodiments above. Essentially, the program(s) running on the mobile device can manage the other devices on the network to provide customized intelligent lighting solutions for a specific zone (e.g., front of a house).

Referring again to FIG. 39, communication interface 610 may be configured to facilitate the communication between the mobile device 600 and other devices on the network (see FIG. 37). The communication interface 610 can be configured to transmit and receive signals/data via wireless network connections. For example, the mobile device 600 can communicate via the communication interface 610 with the wireless motion sensors, lighting devices, controller, low-voltage landscape light with wireless connectivity via Bluetooth or RF connections. Other known communication methods, which provide a medium for transmitting data are also contemplated. The communication interface 610 can additionally support wired communications as well.

I/O interface 608 can allow the mobile device 600 to interact with a user. For example, the I/O interface 608 can be a touch screen that displays an interactive screen (e.g., screens illustrated in FIGS. 20-24) for the programs (or apps) running on the mobile device 600. The touch screen can also receive touch or gesture input from a user. Any other conventional I/O interface can also be incorporate into the mobile device.

The devices, systems, and methods described herein provide the technical advantage of retrofitting an existing wired lighting system with a wireless controller by providing a connector that can be easily installed onto existing wires.

Figure 40:
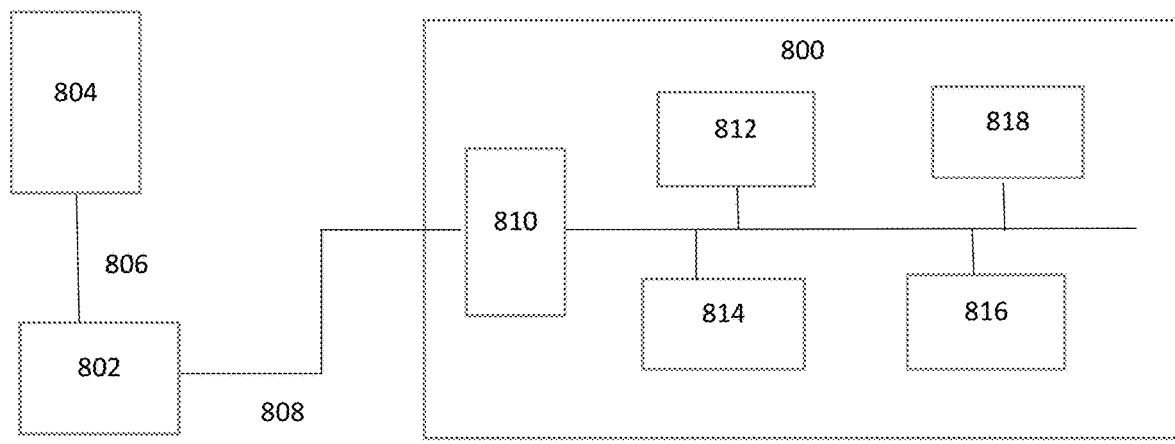
FIG. 40 is a block diagram illustrating the exemplary components of a camera connected to a power source, according to an embodiment of the disclosure.

FIG. 40 is a block diagram illustrating a camera 800 connected to a power source 802, according to an embodiment of the disclosure. The camera can be an Internet Protocol (IP) camera, security camera, or any other types of camera. The power source 802 can be a land power source from a house, garage, or any land lines. In this embodiment, the power source 802 can be a low-voltage power source from a transformer as such transformer 105 of FIG. 1. The power source 802 can be on a timer such that it only provides power to the camera 800 during a certain period of the day (e.g., during the day or the night or from a first time to a second time). In one embodiment, the timer can be remotely set by device 804. Device 804 can be connected to the power source 802 by either a wired or wireless connection 806.

The camera 800 can be connected to and powered by the power source 802 via a wire 808. In addition, the camera 800 can include a battery 810. The battery 810 can power the camera 800 when the external power source 802 is off. The battery 810 can be any type of rechargeable battery suitable for powering a camera. When the power source 802 is on, it can power the camera 800 and recharge the battery 810. When the power source 802 is off, the camera can be powered by the battery 810. This allows the camera to remain on for a long duration. In one embodiment, the camera 800 can be powered by the power source 802 during night and by the battery 810 during the day. For example, the camera 800 can be powered by the power source from 7 pm to 7 am and by the battery from 7 am to 7 pm.

The camera can additionally include a motion sensor 812, a light 814, a memory 816, and a communication module 818. The motion sensor 812 can enable the light 814 when motion is detected when, for example, there is not enough ambient light. The camera 810 itself can also be activated by a signal from the motion sensor 812. The memory 816 can store images or videos captured by the camera 810. The communication module 818 allows the camera to communicate with other devices (not shown in FIG. 40) via wired or wireless connections. The camera 810 can transmit captured images and videos to a remote device via the communication module 818.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A computer-implemented method performed by a device connected to a light and at least a first sensor, the method comprising:
    setting a first condition for activating the light;
    setting a second condition for deactivating the light;
    transmitting a first signal to the light to activate the light when the first condition is met;
    transmitting the second signal to the light to deactivate the light when the second condition is met;
    setting a third condition for activating the first sensor;
    receiving a signal from the first sensor;
    determining the light and the first sensor are both within a predefined zone;
    activating the light if the light is deactivated, the third condition is met and the light and the first sensor are determined to be within the predefined zone
    if the light is activated and the third condition is met, keep the light activated.

2. The computer-implemented method of claim 1, wherein the first condition comprises a first time and the second condition comprises a second time.

3. The computer-implemented method of claim 1, wherein the first condition comprises a first time and the second condition comprises receiving a signal from a second sensor.

4. The computer-implemented method of claim 3, wherein the second sensor is a light sensor and the signal from the second sensor indicates dawn.

5. The computer-implemented method of claim 1, wherein the first condition comprises receiving a signal from a second sensor and the second condition comprises a time.

6. The computer-implemented method of claim 1, wherein the first sensor comprises a motion sensor.

7. The computer-implemented method of claim 6, wherein the third condition comprises a time range.

8. The computer-implemented method of claim 7, wherein the time range is between dusk and dawn.

9. A controller connected to a wireless device, a mobile device and a light; the controller configured to perform the steps of:
    receiving a first signal from the mobile device;
    receiving a second signal from the mobile device;
    receiving a third signal from the wireless device;
    activating the light in response to the first signal;
    deactivating the light in response to the second signal;
    determining the light and the wireless device are both within a predefined zone;
    activating the light if the light is deactivated, the third signal indicates a detection of motion, and the light and the wireless device are determined to be within the predefined zone;
    ignoring the third signal if the second signal has not been received.

10. The controller of claim 9, wherein the first signal comprises a first time for activating the light and the second signal comprises a second time for deactivating the light.

11. The controller of claim 9, wherein the wireless device comprises a motion sensor and the third signal indicates a detection of motion by the motion sensor.

12. The controller of claim 9, wherein the controller comprises a light sensor and the controller is further configured to activating the wireless device in response to receiving a first signal from the light sensor and deactivating the wireless device in response to receiving a second signal from the light sensor.

13. The controller of claim 12, wherein the first signal from the light sensor indicating dusk and the second signal from the light sensor indicating dawn.

14. The controller of claim 9, wherein the controller is further connected to a transformer and wherein the controller is configured to connect the transformer to the light to provide power for the light.

15. The controller of claim 9, wherein the controller is connected to the wireless device and the mobile device via a wireless connection.

* * * * *